(12) United States Patent
Yamazaki

(10) Patent No.: US 7,281,091 B2
(45) Date of Patent: Oct. 9, 2007

(54) STORAGE CONTROLLING APPARATUS AND DATA STORING METHOD

(75) Inventor: Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 10/349,022

(22) Filed: Jan. 23, 2003

(65) Prior Publication Data
US 2004/0003174 A1 Jan. 1, 2004

(30) Foreign Application Priority Data
Jun. 28, 2002 (JP) .............................. 2002-191456

(51) Int. Cl.
*G06F 12/00* (2006.01)
(52) U.S. Cl. .................................... 711/118
(58) Field of Classification Search ................ 711/118, 711/156, 135
See application file for complete search history.

(56) References Cited

U.S. PATENT DOCUMENTS

| | | | | |
|---|---|---|---|---|
| 3,916,388 A | * | 10/1975 | Shimp et al. ................ | 711/201 |
| 4,349,875 A | * | 9/1982 | Tada ........................... | 711/135 |
| 5,860,107 A | * | 1/1999 | Patel .......................... | 711/140 |
| 5,894,569 A | * | 4/1999 | Arimilli et al. .............. | 712/225 |
| 5,960,455 A | * | 9/1999 | Bauman ...................... | 711/120 |
| 6,085,297 A | | 7/2000 | Satoh | |
| 6,101,596 A | * | 8/2000 | Tanaka et al. ............... | 712/216 |
| 6,205,520 B1 | * | 3/2001 | Palanca et al. .............. | 711/138 |
| 6,275,902 B1 | * | 8/2001 | Hotta et al. .................. | 711/129 |
| 6,289,438 B1 | * | 9/2001 | Takayanagi .................. | 712/218 |
| 6,321,300 B1 | * | 11/2001 | Ornes et al. ................. | 711/135 |
| 6,374,334 B1 | * | 4/2002 | Suga et al. .................. | 711/158 |

FOREIGN PATENT DOCUMENTS

| | | |
|---|---|---|
| JP | 6-4402 | 1/1994 |
| JP | 10-55303 | 2/1998 |

* cited by examiner

*Primary Examiner*—Matthew Kim
*Assistant Examiner*—Sheng-Jen Tsai
(74) *Attorney, Agent, or Firm*—Staas & Halsey LLP

(57) ABSTRACT

A storage controlling apparatus comprises a store port for holding store data that is transmitted from an arithmetic unit in correspondence with a store request transmitted from an instruction processing device, and is to be written to a cache memory or a memory. The storage controlling apparatus further comprises a data storing unit which receives the store data from the store port, temporarily stores the store data, and comprised between the store port and the cache memory or the memory, and a data write controlling unit which controls a write of the store data from the store port to the data storing unit.

49 Claims, 20 Drawing Sheets

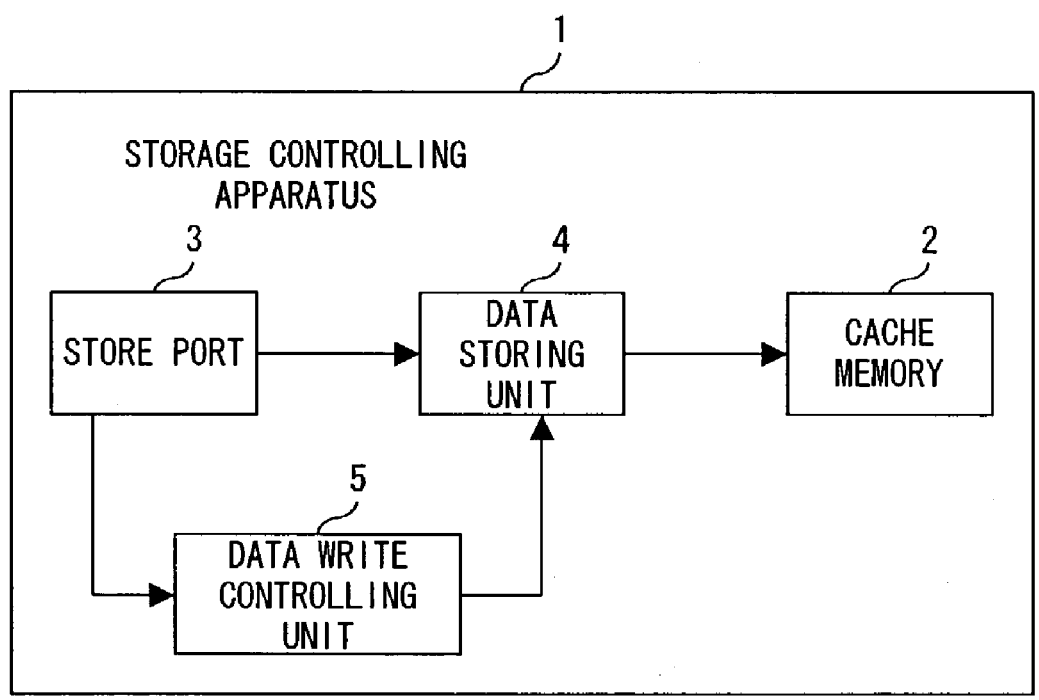
F I G. 1

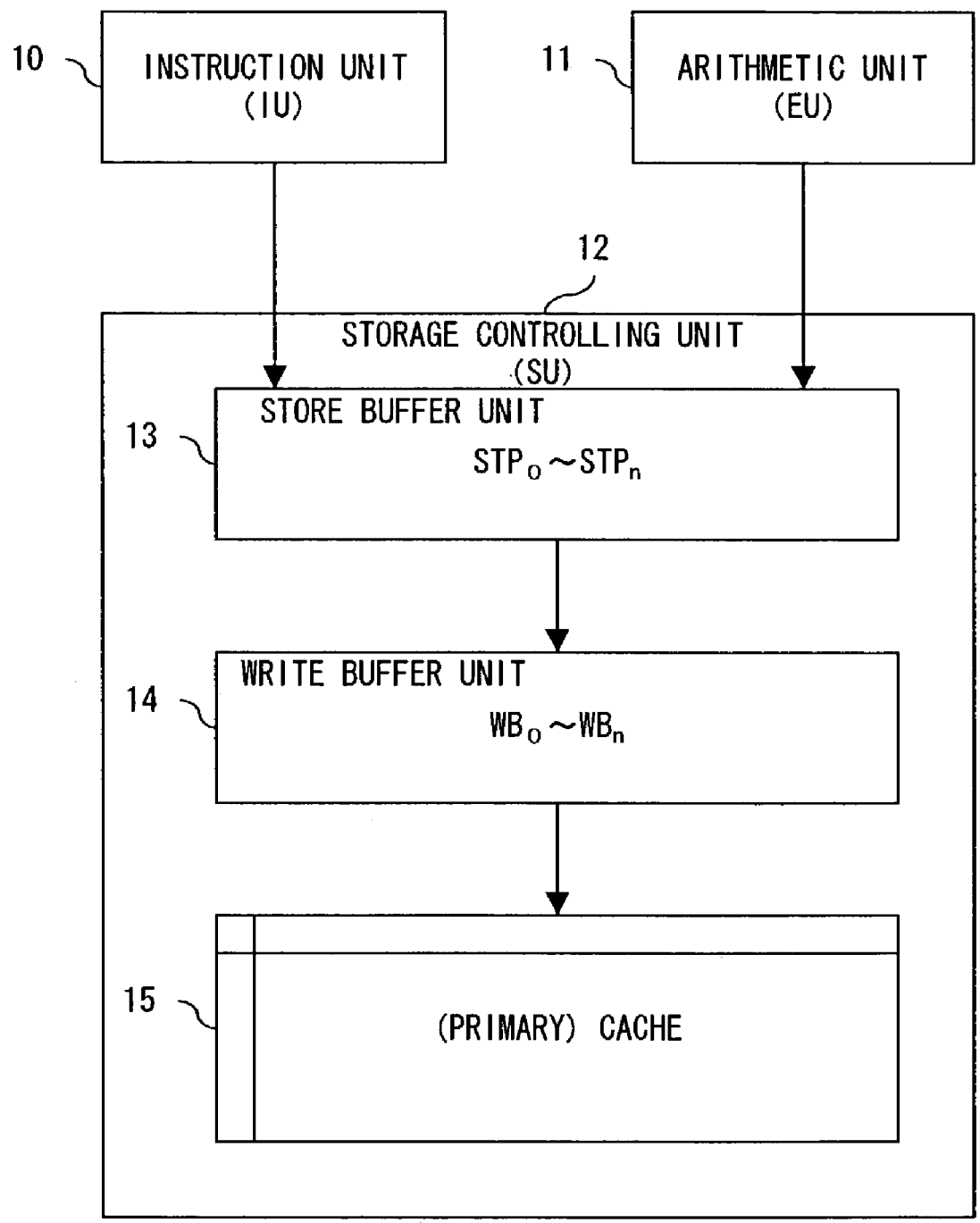
F I G. 2

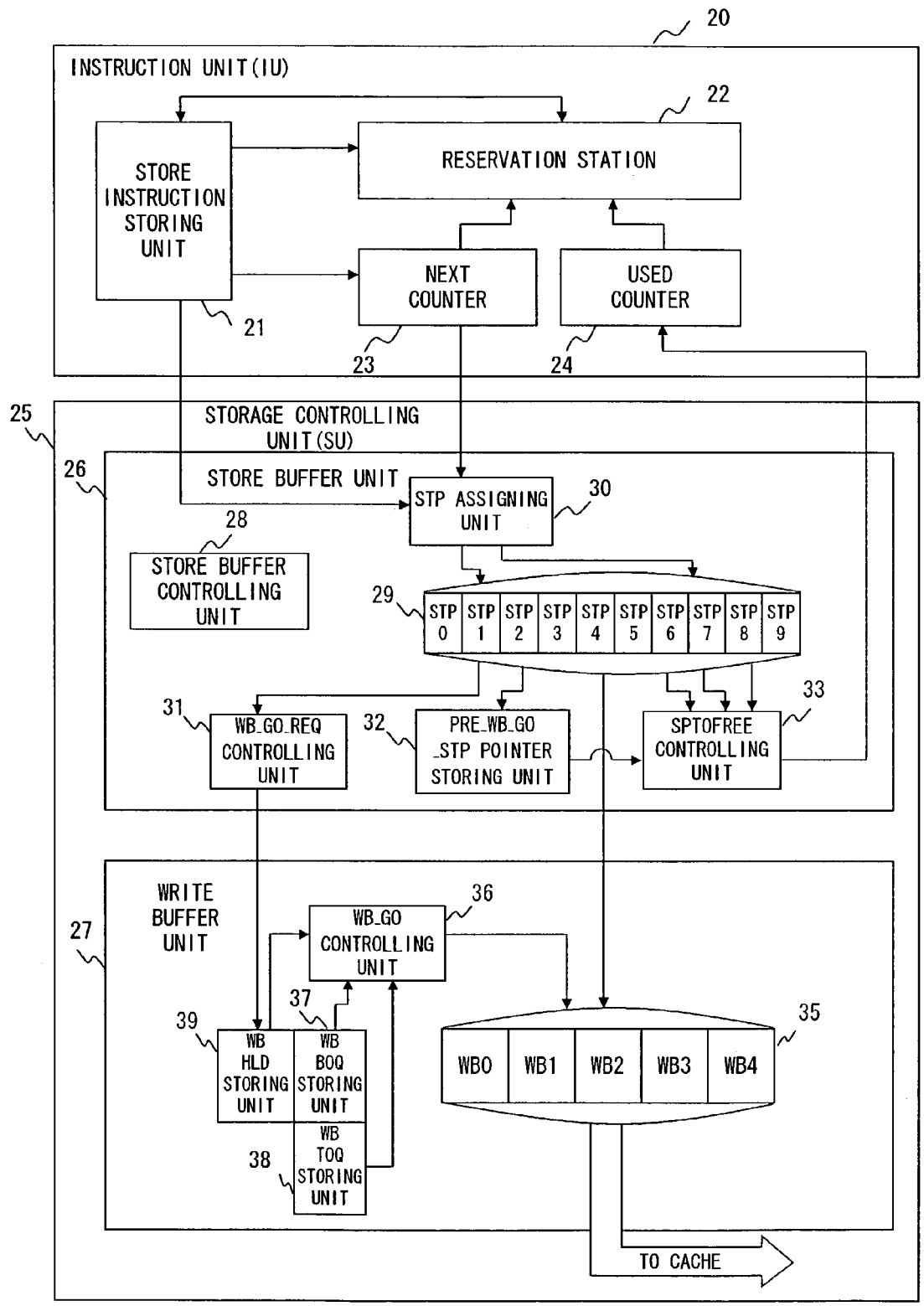
F I G. 3

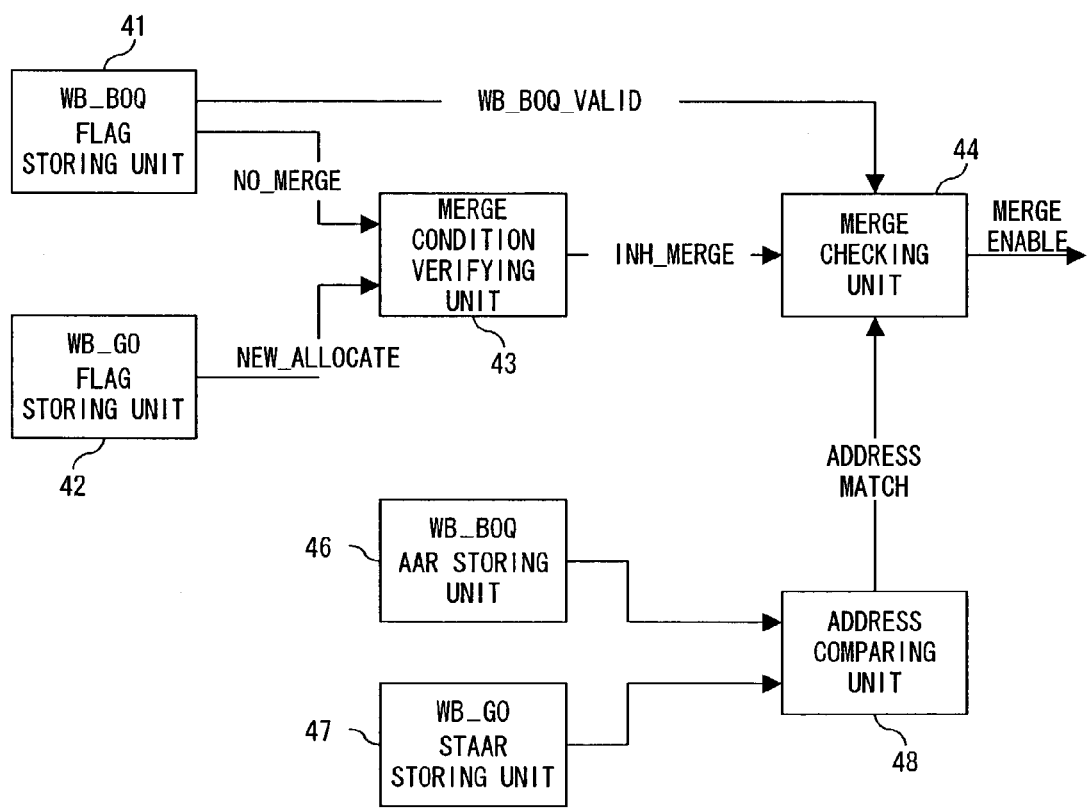
F I G. 4

```
[STORE-PORT]                      [WRITE-BUFFER]
  bit:usage                         bit:usage
    0-1:SID[1:0]                      0:VAL
      2:WBHLD-FLAG                    1:XCPTN
      3:OPHLD-FLAG                    2:OPHLD-FLAG
      4:PSTV                          3:SXHLD-FLAG  o
      5:RSTDV                         4:SXEWT-FLAG  o
      6:READY                         5:SUASI-FLAG  o
      7:LID                           6:LID
      8:TLB-CP                        7:ASI_WRT_GO_1TC
      9:TLB-SE                        8:ST1_KICK    o
     10:TLB-LE                     9-10:OPWAY[1:0]
  11-12:OPWAY[1:0]                11-14:LBS_BANK[3:0] o
  13-20:BM[7:0]                      15:BST-1ST
     21:POST_CAN                     16:BST-LAST
  22-28:STB-OPC[6:0]                 17:NOMRG
     29:BST-1ST                      18:J8B_EVN    o
     30:BST-LAST                     19:J8B_ODD    o
  31-39:ASI[7:0,P]                   20:DIS_ST_EVN o
  40-46:IID[5:0,X]                   21:DIS_ST_ODD o
     47:INH-SFB                   22-26:WB-OPC[4:0]
  48-52:ADRS[4:0]                 27-35:ASI[7:0,P]
  53-56:LENGTH[3:0]               36-39:QBM[3:0]
     57:OF_M_SFB_ENB_STB          40-55:BM[15:0]
     58:OG_M_SFB_ENB_STB             56:INH-SFB
     59:THREAD-ID                    57:OF_M_SFB_ENB_STB
                                     58:OG_M_SFB_ENB_STB
                                     59:OF_M_SFB_BOGUS
                                     60:OF_M_SFB_BOGUS
                                     61:THREAD-ID
                                     62:POST-CAN
```

FIG. 5

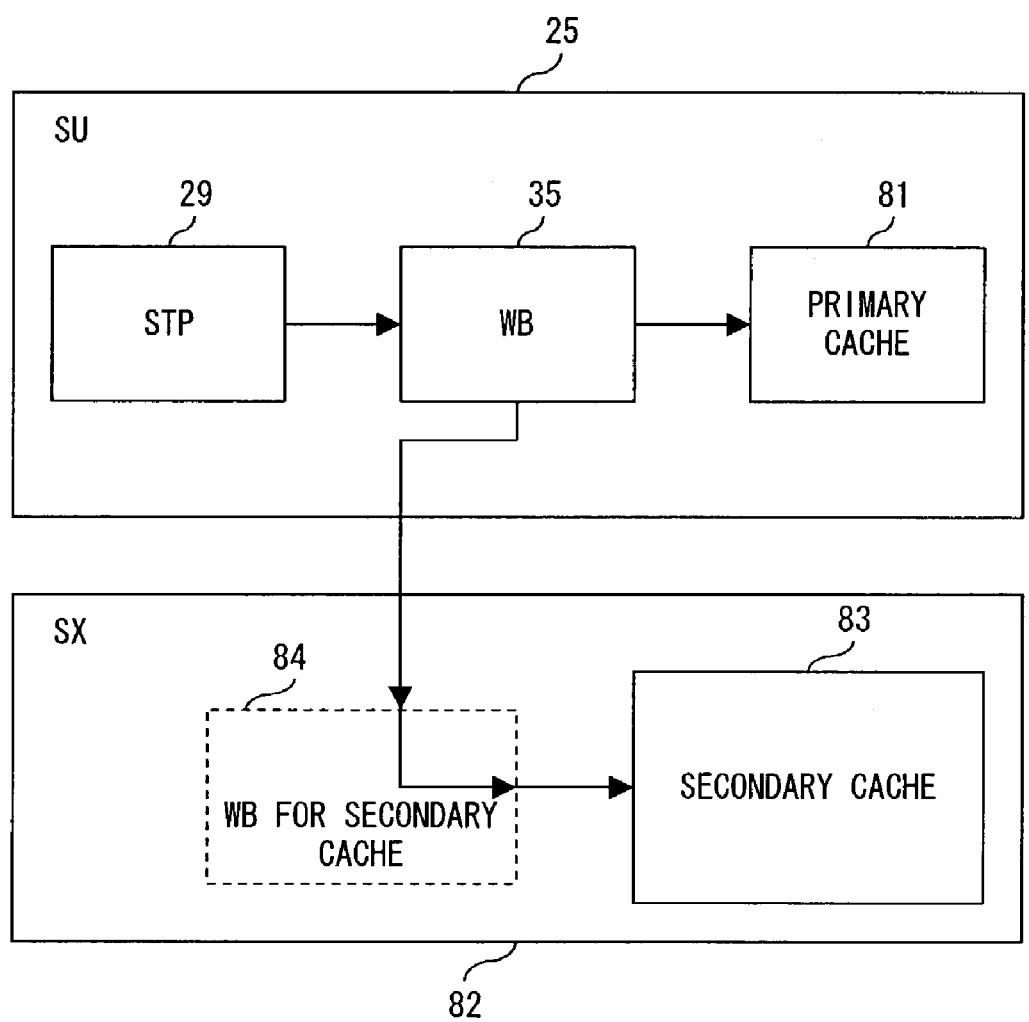
F I G. 6

| | |
|---|---|
| WB0 | STORE FOR adrs-B |
| WB1 | 8-BYTE STORE FOR FIRST HALF 8 BYTES OF adrs-A |
| WB2 | STORE FOR adrs-C |
| WB3 | 4-BYTE STORE FOR FIRST HALF 8 BYTES OF adrs-A |
| WB4 | EMPTY |

F I G. 7

|  |  | ST1/ST2 REQUEST IS POSSIBLE | | | ST1/ST2 REQUEST IS IMPOSSIBLE |
|---|---|---|---|---|---|
| WB | WB0 | WB1 | WB2 | WB3 | WB4 |
| STATUS | INVALID | VALID WB_TOQ | VALID | VALID | VALID WB_BOQ |

F I G. 1 2

| | ST1/ST2 REQUEST IS IMPOSSIBLE | ST1/ST2 REQUEST IS POSSIBLE | | | |
|---|---|---|---|---|---|
| WB | WB0 | WB1 | WB2 | WB3 | WB4 |
| STATUS | INVALID WB_BOQ | VALID WB_TOQ | VALID | VALID | VALID |

F I G. 1 3

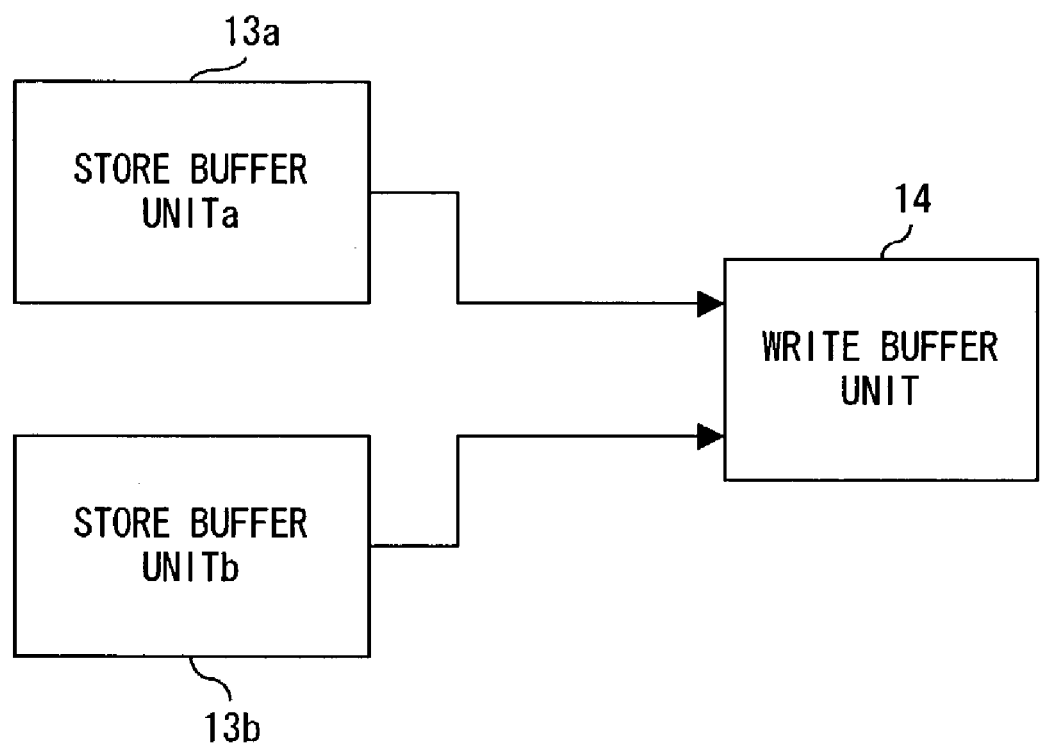
F I G. 1 6

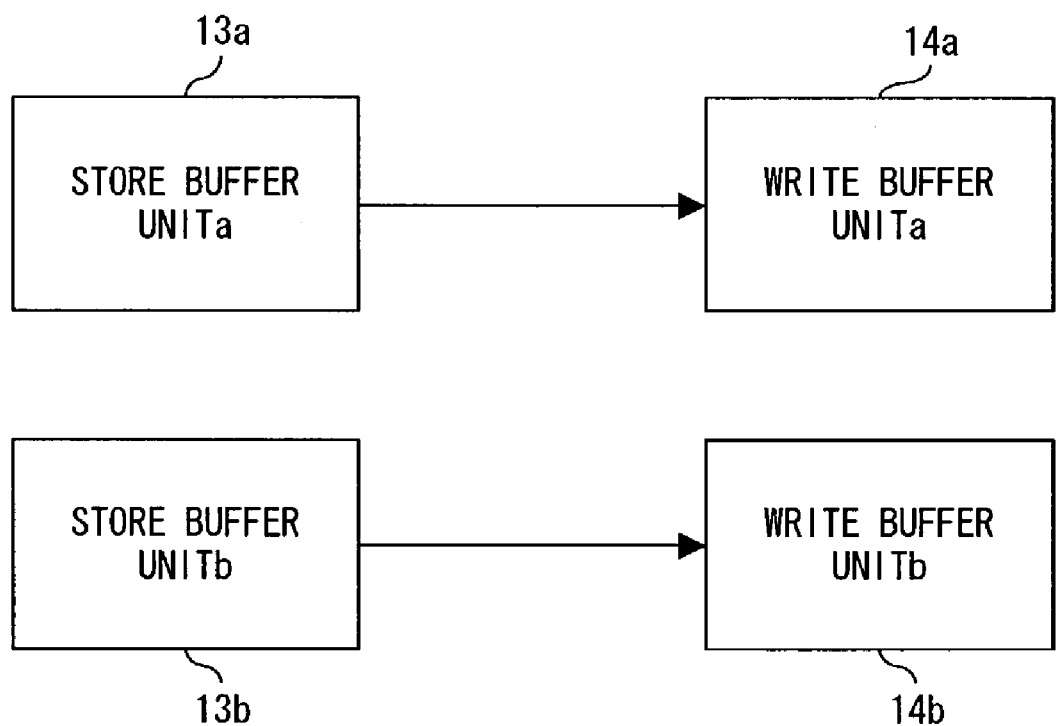
F I G. 1 7

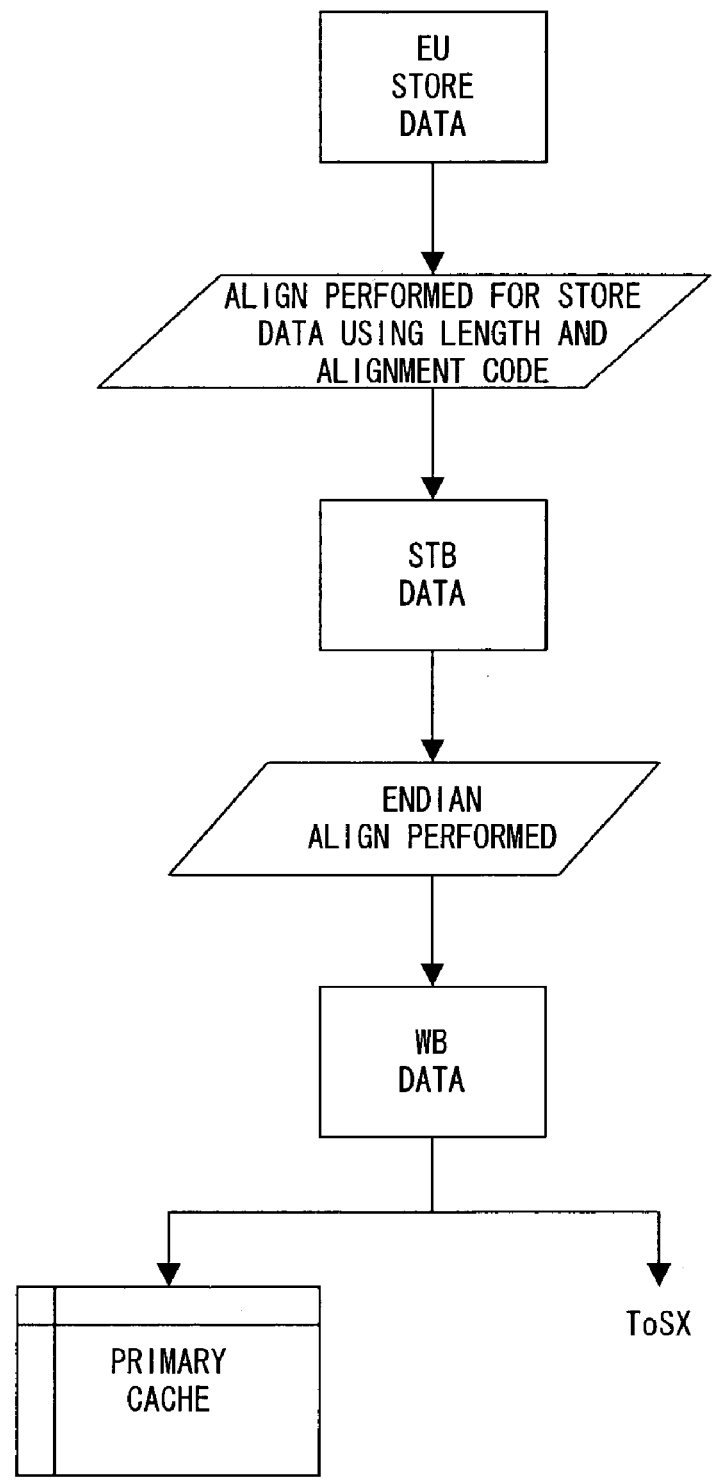
F I G. 1 8

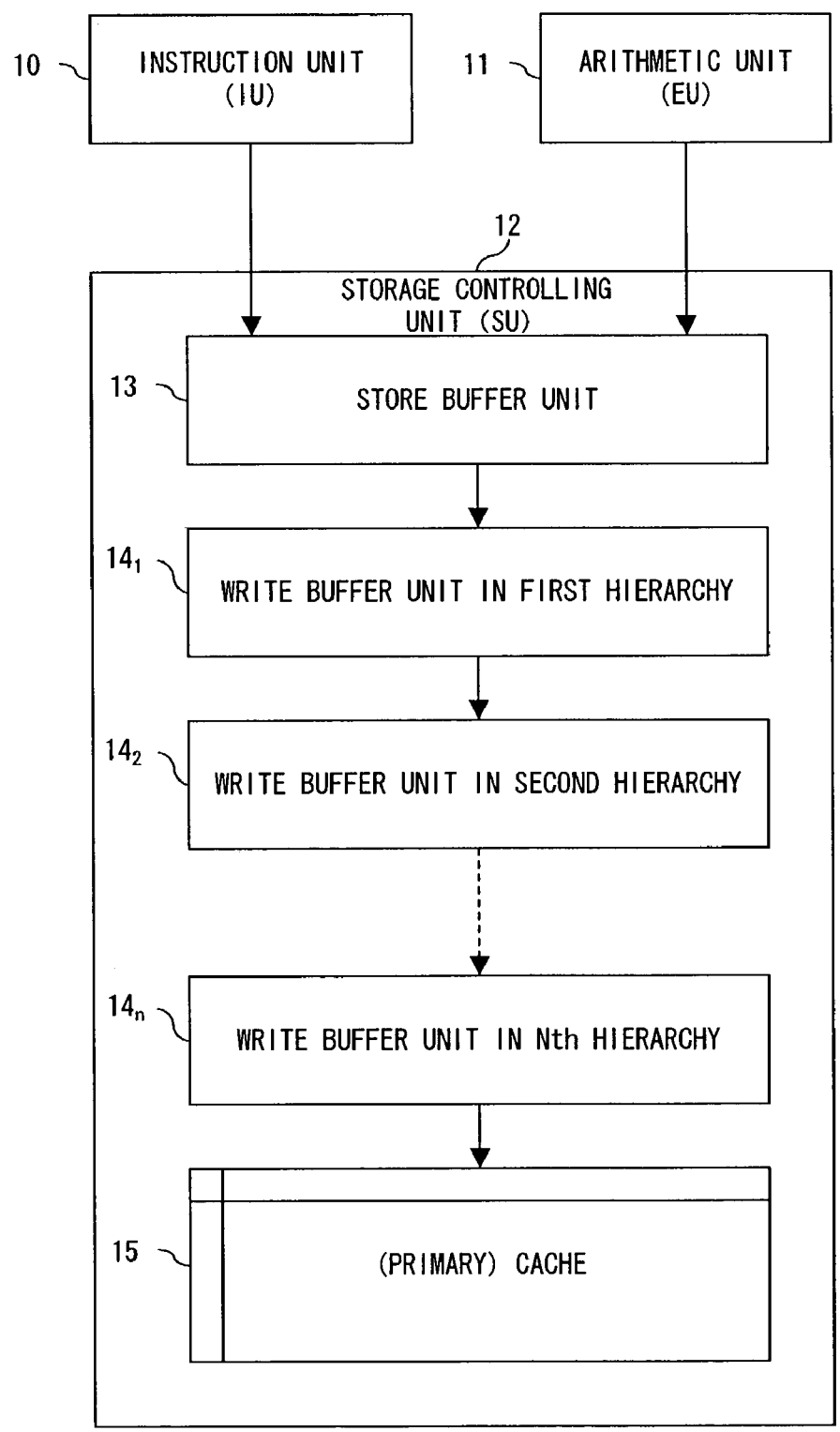
F I G. 1 9

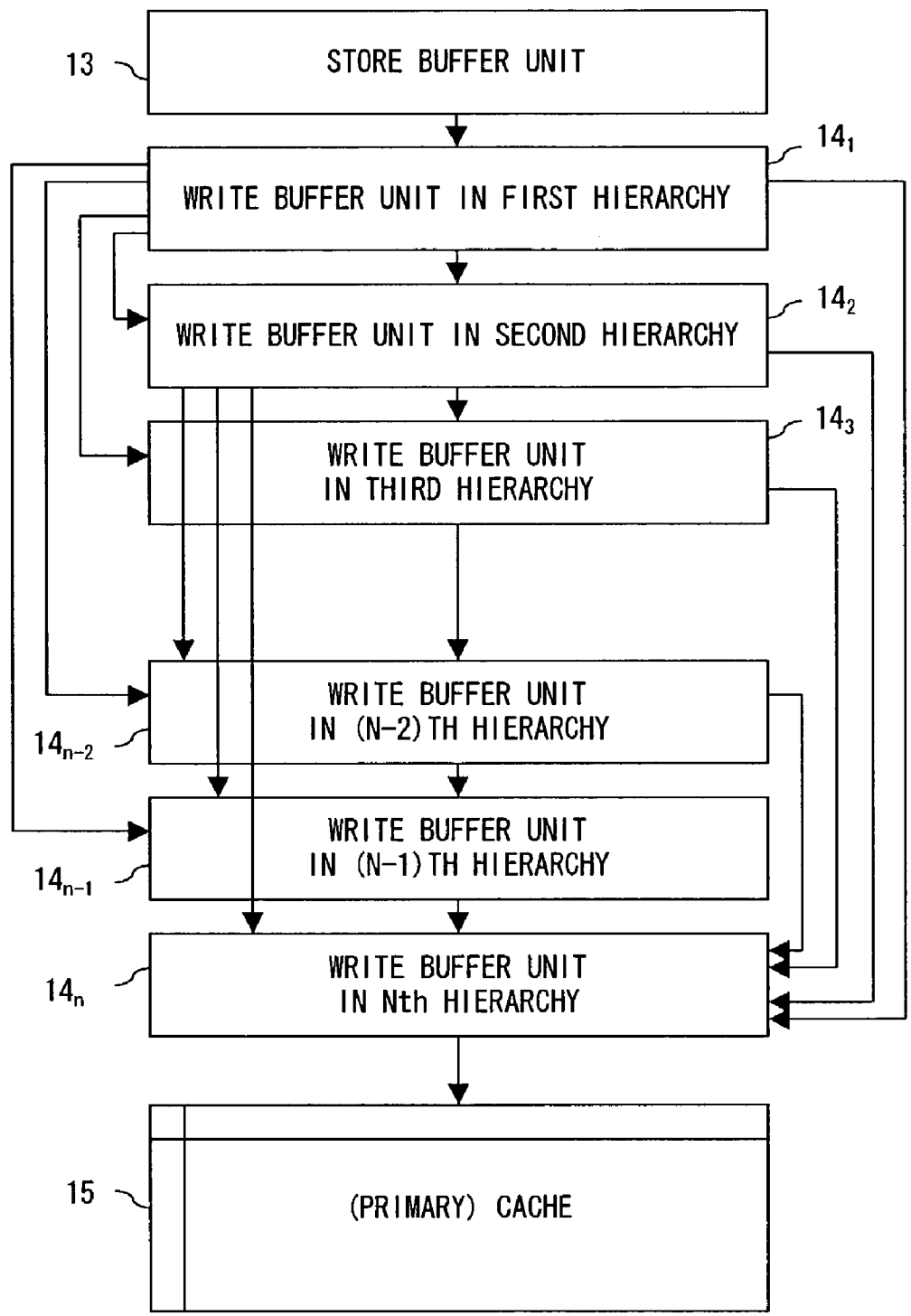
F I G. 2 0

STORAGE CONTROLLING APPARATUS AND DATA STORING METHOD

BACKGROUND OF THE INVENTION

1. Field of the Invention

The present invention relates to a controlling method for use in a data processing device, and more particularly, to a storage controlling method for use in a processor comprising a store port for holding store data, which is transmitted from an arithmetic unit and is to be stored in a cache memory, etc.

2. Description of the Related Art

Mainly in a super scalar processor, etc. adopting an out-of-order method, a process of a store request is performed by assigning the store request, for example, to a store port or a write buffer, which is managed by an instruction processing device and intended to temporarily hold data to be stored in a cache memory or a memory such as a main storage.

As conventional techniques using such a store buffer, the following documents exist.

Document 1) Japanese patent Publication No. H6(1994)-4402 "Data Processing Device"

Document 2) Japanese Patent Publication No. H10(1998)-55303 "Memory System"

Document 1 discloses a technique with which a write buffer for holding at least one write address and data is comprised between a central processing unit and a cache, and write data is first written to the write buffer when a store instruction is executed, and then written to the cache storage device, in a data processing device comprising the cache storage device between the central processing unit and a main storage device.

Document 2 discloses a memory system in which an instruction bus and a data bus are separately arranged, 4 write buffers that are interposed in parallel between a CPU and a main storage device, and do not have an address comparator are comprised, and a data write is made to a memory via a write buffer, so that the speed of the entire system is improved.

Conventionally, a data write was directly made from a write buffer or a store port to a primary cache as described above. Additionally, a dedicated write buffer was sometimes arranged for a secondary cache memory. However, a write to a primary cache was directly made from a write buffer or a store port also in this case.

In recent years, however, the demand for enabling out-of-order execution with much more inflight request has been rising to improve a throughput. For example, the need for increasing the number of store ports (or write buffers) has been arising. If the number of store ports is increased to improve a throughput in correspondence with such a demand, the number of store ports (or write buffers) to be processed increases, which requires a time, for example, to select from which store port data is to be stored in a cache memory. To perform such an operation on one cycle, one cycle time must be made longer, and an improvement in the throughput cannot be expected due to an increase in the number of store ports. Accordingly, a method with which out-of-order execution with much more inflight request is enabled without degrading a throughput is demanded.

SUMMARY OF THE INVENTION

An object of the present invention is to improve the throughput of a storage controlling apparatus when a store instruction is executed without fundamentally increasing the number of store ports.

To achieve the above described object, a storage controlling apparatus according to the present invention comprises a store port for holding store data that is transmitted from an arithmetic unit in correspondence with a store request transmitted from an instruction processing device, and is to be written to a cache memory or a memory by the store request. The storage controlling apparatus further comprises: a data storing unit receiving the store data from the store port, temporarily storing the store data, and comprised between the store port and the cache memory or the memory; and a data write controlling unit controlling a write of the store data from the store port to the data storing unit.

The data storing unit is configured, for example, by a plurality of write buffers. Store data is stored in an order from the store port to the data storing unit, and from the data storing unit to the cache memory or the memory. Therefore, the throughput of the storage controlling apparatus when a store instruction is executed can be improved without fundamentally increasing the number of store ports.

BRIEF DESCRIPTION OF THE DRAWINGS

FIG. 1 is a block diagram showing the principle of a storage controlling apparatus according to the present invention;

FIG. 2 explains fundamentals of a method storing data in a cache in a preferred embodiment;

FIG. 3 is a block diagram showing the details of configurations of an instruction unit and a storage controlling unit;

FIG. 4 explains fundamental processes for storing data in a write buffer and for merging data;

FIG. 5 shows flags held on store port and write buffer sides;

FIG. 6 explains store-in and store-through processing methods;

FIG. 7 shows data store in 5 write buffers;

FIG. 12 explains the relationship between the statuses of write buffers and pipeline requests (No. 1);

FIG. 13 explains the relationship between the statuses of write buffers and the pipeline requests (No. 2);

FIG. 16 explains a write buffer application method (No. 2) for use in the data processing device that adopts a multithread;

FIG. 17 explains a write buffer application method (No. 3) for use in the data processing device that adopts a multithread;

FIG. 18 explains a data aligning method in the preferred embodiment;

FIG. 19 explains a storage controlling unit comprising write buffer units of a plurality of hierarchies; and FIG. 20 explains a data propagation time shortening method in write buffers of a plurality of hierarchies.

DESCRIPTION OF THE PREFERRED EMBODIMENTS

Figure 8:
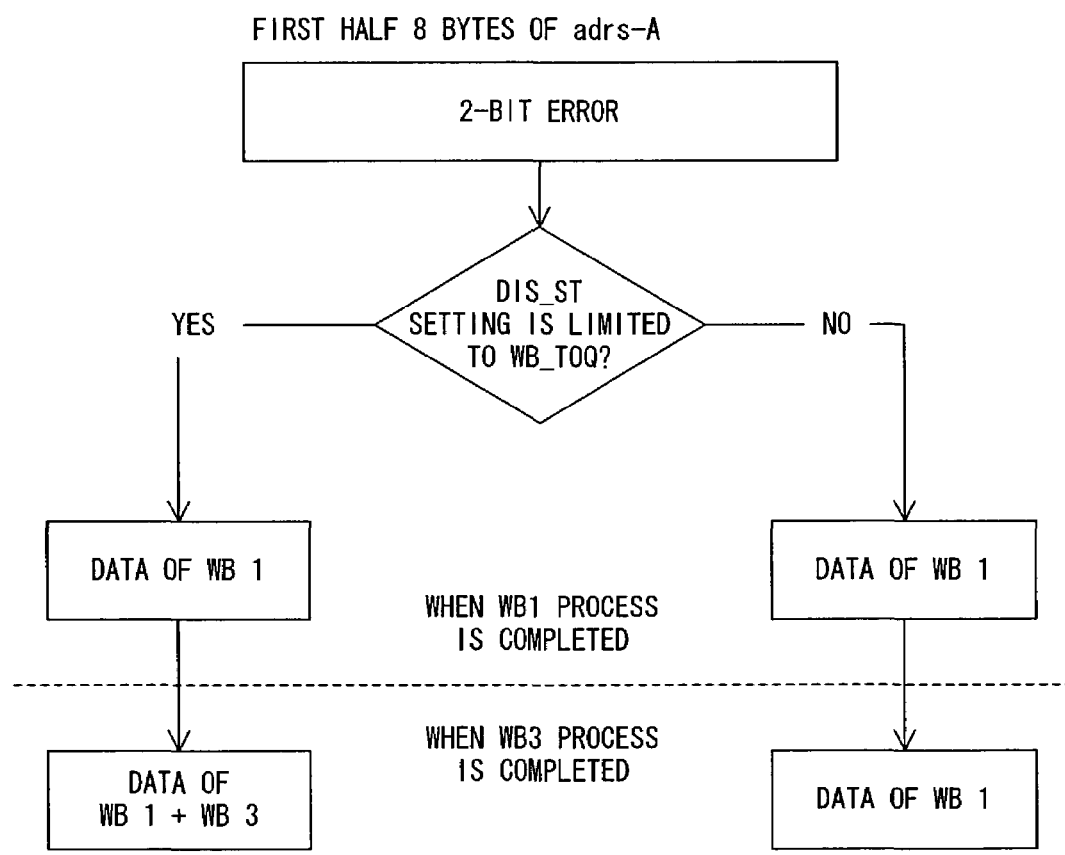
FIG. 8 explains the contents of the first half 8 bytes at an address A.

FIG. 1 is a block diagram showing the principle of the configuration of a storage controlling apparatus according to the present invention. This figure is the block diagram showing the principle of the configuration of the storage controlling apparatus 1 comprising a store port 3 for holding store data that is transmitted from an arithmetic unit in correspondence with a store request transmitted from an instruction processing device, and is to be stored in a cache memory 2 or a memory such as a main storage by the store request.

In FIG. 1, the storage controlling apparatus 1 further comprises a data storing unit 4 and a data write controlling unit 5 in addition to the cache memory 2 and the store port 3. The data storing unit 4 is, for example, a write buffer, which receives store data from the store port 3 between the store port 3 and the cache memory 2 or the memory, and temporarily stores the store data. The data write controlling unit 5 controls a write of the store data from the store port 3 to the data storing unit 4.

In a preferred embodiment according to the present invention, the data storing unit 3 may receive store data from the store port 3 after the instruction processing device commits the execution of a store request.

In the preferred embodiment, the data storing unit 4 may comprise a plurality of write buffers which respectively store the store data received from the store port, and the data write controlling unit 5 may also control a data write to limited write buffers by limiting write buffers to a range from a write buffer in which data is stored most recently to a write buffer ahead by n buffers among a plurality of write buffers in an order where data is to be stored, when the instruction processing device simultaneously commits the execution of n (n≧1) store requests. At this time, the store port from which the data is output can be freed up.

The storage controlling apparatus may further comprise a memory write controlling unit controlling a data write from the data storing unit 4 to the cache memory 2 or the memory independently of the instruction processing device.

Additionally, the storage controlling apparatus may comprise write buffers the number of which conforms to the reply performance of the cache memory or the memory, and store ports the number of which conforms to the performance of the instruction processing device.

Furthermore, control flags required to process identical numbers of store requests may be held on the sides of the store port and the data storing unit.

Still further, in the preferred embodiment, if the cache memory is configured by a plurality of hierarchies, and if a store-in or a store-through method is adopted, or if both of the store-in and the store-through methods are adopted, a data write to each of the hierarchies of the cache memory is made from the data storing unit.

Still further, in the preferred embodiment, data already stored in correspondence with a preceding store request can be also merged with data from the store port in correspondence with the next store request, in the data storing unit. In this case, the write buffer has a data width that enables merging of the data from the store port, and is wider than that of the store port.

However, such data merging may be prohibited according to the types of the preceding and the next store requests, or may be forcibly executed. If cancellation of a store request is notified from the instruction processing device, data merging can be also prohibited.

In the preferred embodiment, also a store data bypass fetch, with which store data is directly and externally provided from the store port or the data storing unit, may be performed in correspondence with an external fetch request.

In this case, for example, if the store data bypass fetch from the data storing unit is permitted, whether or not to permit the bypass fetch can be finally determined by making a comparison between byte marks in units of 1 byte after making a comparison in units of plural bytes between the byte marks which indicate the existence positions of data respectively for store and fetch requests, and selecting store data as a bypass permitted candidate.

Still further, in the preferred embodiment, the storage controlling apparatus may configure a data processing device controlled by a central processing unit which can perform multithreading. In this case, a plurality of threads may share the store port and the data storing unit. Or, the plurality of threads may share the data storing unit, and each of the threads may exclusively hold a store port. Otherwise, each of the threads may exclusively hold a store port and a data storing unit.

In this preferred embodiment, a thread identifier for identifying each thread in a multithread may be held respectively for a store port and the data storing unit. If the identifier of a thread held for the store port or the data storing unit and that of a thread which requests a fetch are different in the above described store data bypass fetch control, the store data bypass fetch can be prohibited. Or, if the identifiers of threads held for the store port and the data storing unit are different in the control of merging data stored in the data storing unit with data from a store port, data merging can be prohibited. Also when a cancellation signal of a store request is received from the instruction processing device at the time of thread switching, data merging is prohibited.

In the preferred embodiment, the storage controlling apparatus may further comprise an aligning unit aligning store data to the same format as that when being stored in the memory by the time the store data is stored in the data storing unit. In this case, a store port and a unit performing an alignment process according to, for example, an address and an operand length may be arranged close to the arithmetic unit, and the data storing unit may be arranged close to the cache memory or the memory.

Furthermore, in the preferred embodiment, the data storing unit 4 may comprise a cache line requesting unit entering a cache line request into a pipeline of the storage controlling apparatus, when the store request misses the cache.

Still further, in the preferred embodiment, the data storing unit 4 may comprise a plurality of write buffers which respectively store the store data received from the store port 3, and the storage controlling apparatus may further comprise a memory write controlling unit performing a control such that a data write to the cache memory 2 or the memory is made from a write buffer other than the write buffer in which data is stored most recently from the store port among the plurality of write buffers.

In this case, if the store port becomes empty, if a succeeding instruction cannot be executed because the data write from the write buffer in which the data is stored most recently is not made, if the cache line for the data stored in that write buffer is externally requested to be freed up, or if the data stored in the write buffer is prohibited from being merged with data for another store request, a data write from the write buffer in which the data from the store port is stored most recently to the cache memory or the memory is made.

Additionally, the storage controlling apparatus according to the present invention comprises: a plurality of buffer units respectively storing store data that is transmitted from the arithmetic unit and is to be written to the cache memory or the memory by a store request; and a memory write controlling unit limiting only a buffer unit in which data is stored earliest among the plurality of buffer units, and performing a control to abort the storage of store data in the cache memory or the memory if the length of the store data is shorter than that of a unit area for which data error management is made in the cache memory 2 or the memory.

Additionally, according to the present invention, a storage controlling apparatus, which comprises a store port for holding store data that is transmitted from an arithmetic unit in correspondence with a store request transmitted from an instruction processing device and is to be written to a cache memory or a memory by the store request, further comprises: data storing units of a plurality of hierarchies temporarily holding store data respectively between the store port and the cache memory or the memory; and a store data write controlling unit controlling a write of store data from the store port to the cache memory or the memory via data storing units of one or more hierarchies among the plurality of hierarchies.

In this case, the data storing units of the plurality of hierarchies respectively comprise a plurality of write buffers, and the store data write controlling unit controls a write of store data not via a hierarchy in which all of a plurality of write buffers are empty, but via a hierarchy in which a write buffer to which data can be written exists if a hierarchy in which all of write buffers hold data does not exist among the plurality of hierarchies, or the store data write controlling unit can also control a write of store data via a write buffer unit in a hierarchy closer by one hierarchy from a hierarchy close to the side of the store port among hierarchies in which all of write buffers hold data if such hierarchies exist.

A data storing method according to the present invention is a method comprising: storing store data transmitted from an arithmetic unit in one of a plurality of store ports in correspondence with a store request transmitted from an instruction processing device; storing the data stored in the store port in one of a plurality of write buffers; and storing the data stored in the write buffer in a cache memory or a memory.

In the preferred embodiment according to the present invention, data stored in a store port may be stored in a write buffer after the instruction processing device commits the execution of a store request.

Additionally, in the preferred embodiment according to the present invention, in the control of the storage of data stored in a write buffer to the cache memory or the memory, data may be stored in the cache memory or the memory from a write buffer other than a write buffer in which data is stored from the store port most recently among the plurality of write buffers.

As described above, according to the present invention, a data storing unit configured, for example, by a plurality of write buffers is arranged between a store port and a cache memory or a memory, and store data is stored in an order from the store port to the data storing unit, and from the data storing unit to the cache memory or the memory.

FIG. 2 explains the fundamentals of a method storing data in a cache according to a preferred embodiment of the present invention. In this preferred embodiment, data transmitted from an arithmetic (execution) unit (EU) 11 is stored in a (primary) cache 15 via a store buffer unit 13 and a write buffer unit 14 within a storage controlling unit 12, namely, a storage controlling apparatus in correspondence with a store request transmitted from an instruction processing device, namely, an instruction unit (IU) 10.

In this preferred embodiment, after the data transmitted from the arithmetic unit 11 is stored in any of (n+1) store ports ($STP_0$ to $STP_n$) within the store buffer unit 13, it is stored in any of (n+1) write buffers ($WB_0$ to $WB_n$) within the write buffer unit 14 when a store instruction is committed, and then stored in the (primary) cache 15. In this preferred embodiment, each of the STPs has an 8-byte data width, whereas each of the WBs has a 16-byte data width.

FIG. 3 is a block diagram showing the details of configurations of the instruction unit and the storage controlling unit, which are shown in FIG. 2. In this figure, the instruction unit 20 comprises: a store instruction storing unit 21 storing a store instruction provided to a storage controlling unit 25; a reservation station 22 including a stack waiting to be processed for instruction execution control etc.; a next counter 23 indicating to which store port a store request is assigned among store ports in which an address and data, which correspond to the store request, are to be stored, namely, (n+1) store ports in FIG. 2, or 10 store ports (STPs) in FIG. 3, when the store request is transmitted to the storage controlling unit 25; and a used counter 24 indicating the number of store ports which a store request is assigned to and is currently used among the 10 STPs.

A store buffer unit 26 within the storage controlling unit (SU) 25 in FIG. 3 comprises: a store buffer (STB) controlling unit 28 controlling the entire store buffer unit; STPs 29, namely, (n+1) STPs in FIG. 2, and 10 STPs in FIG. 3; an STP assigning unit 30 assigning a store port in correspondence with a request from the instruction unit 20; a write buffer go request (WB_GO_REQ) controlling unit 31 controlling a data write request from the STP 29 to a write buffer; a prewrite buffer go store port (PRE_WB_GO_STP) pointer storing unit 32 as a pointer pointing to an STP from which data is to be written to a write buffer; and a store port to free (SPTOFREE) controlling unit 33 performing a control for freeing up the STP from which the data is written to the write buffer.

The write buffer unit 27 comprises: write buffers (WBs) 35, namely, 5 WBs in FIG. 3; a write buffer go (WB_GO) controlling unit 36 controlling the storage of data from an STP to a WB; a WB_BOQ storing unit 37 holding a WB bottom of queue (BOQ) as a pointer pointing to a WB in which data is stored most recently etc.; a WB_TOQ storing unit 38 holding a WB top of queue (TOQ) as a pointer pointing to a WB in which data is stored earliest among WBs which hold data etc.; and a WB_HLD storing unit 39 holding a WB hold (HLD) flag indicating that a data write from an STP to a WB is permitted. The storage controlling apparatus, etc. according to the present invention are implemented by hardware, and flags respectively correspond to signals.

FIG. 4 explains a fundamental process for storing data from a store port to a write buffer, and its associated fundamental process for merging data in a write buffer. In this figure, the attribute of data written to a WB last time, and its address, namely, the address in a main storage, and the like are stored in a WB_BOQ flag storing unit 41 in addition to the value of the above described WB_BOQ pointer. Furthermore, in a WB_GO flag storing unit 42, the attribute of data to be written to a WB henceforth, its address, and the like are stored.

A merge condition verifying unit 43 determines whether or not to merge data by using the value of a no-merge flag which is output from the WB_BOQ flag storing unit 41 and will be described later, the value of a new allocate flag which is output from the WB_GO flag storing unit 42 and will be described later, or the like, sets an INH_MERGE flag which indicates that merging is prohibited if merging cannot be permitted, and outputs the INH_MERGE flag signal to a merge checking unit 44.

A WB_BOQ_AAR storing unit 46 stores an address of data written to a WB last time, namely, an absolute address AAR of the data stored in the WB pointed to by the WB_BOQ. Additionally, a WB_GO_STAAR storing unit 47 stores data to be written from the side of an STP to a WB this time, namely, an absolute address of data within the store port. An address comparing unit 48 makes a comparison between these two addresses, and outputs an address match signal to the merge checking unit 44 according to a result of the comparison.

The merge checking unit 44 determines whether or not to permit merging by using an INH_MERGE signal from the merge condition verifying unit 43, an address match signal output from the address comparing unit 48, and a WB_BOQ_VALID signal output from the WB_BOQ flag storing unit 41, namely, a signal indicating that valid data is stored in the WB pointed to by the WB_BOQ, and outputs a merge enable signal if data merging is permitted in the WB.

Next, an operation of 4 cycles on which a data write from a store port STP to a write buffer WB is made is further described in detail with reference to FIGS. 2 to 4. This write operation is performed on the 4 cycles such as a PRE_WB_GO cycle, a WB_GO cycle, a WB_GO_1TC (τ copy) cycle, and a WB_GO_2TC cycle.

The above described PRE_WB_GO_STP exists as a pointer pointing to an STP from which data is to be written to a WB on the WB_GO cycle. The pointer WB_GO_STP holds the value of this pointer after one cycle, and will point to the STP to be used on the WB_GO cycle.

As registers holding the addresses of data stored within an STP, store port absolute address registers (STAAR) 0 to 9 exist. The absolute address of data in the store port pointed to by the PRE_WB_GO_STP is selected, and its result is stored in the WB_GO_STAAR storing unit 47 shown in FIG. 4. The value of this address is also written to the WB_BOQ_AAR storing unit 46 holding the address of data written last time, when data is written to a WB. The data is also written to absolute address registers WB_AAR0 to 4 within the WB which corresponds to the number of the WB to which the data is written.

WB_GO, namely, a data write request from an STP to a WB occurs when the instruction unit determines to execute a store instruction, and a commitment indicating this determination is transmitted to the STP pointed to by the PRE_WB_GO_STP, or when an STP newly pointed to by the PRE_WB_GO_STP receives the commitment. This request is transmitted to the WB_HLD storing unit 39 shown in FIG. 3, and a WB hold (HLD) flag is set. That is, the WB_HLD flag is fundamentally set on the STP side, and passed to the WB side.

The WB_HLD flag is set, so that preparation for the data write from the STP to the WB is terminated. However, the data write to the WB is sometimes made pending depending on the relationship between the WB_BOQ and the WB_TOQ as will be described later. In this case, the data write to the WB is not made until a pending condition is canceled and meanwhile the WB_HLD flag is kept to be set.

The WB_BOQ is used to determine a WB, which becomes a data write destination, when a data write is to be made from an STP to the WB in correspondence with a WB_GO request. If contents of the WB pointed to by the WB_BOQ has been written, for example, to the cache and has been emptied, or if store data must be merged with the data of that WB, the data of the STP is written to the WB.

In other cases, namely, if some data is already stored in the WB pointed to by the WB_BOQ, and if the store data is not merged, the data write is made to the WB (WB_BOQ+1) next to the WB pointed to by the WB_BOQ. That is, the WB to which data is to be written in correspondence with the WB_GO request is a WB pointed to by either WB_BOQ or WB_BOQ+1.

The WB_TOQ is a pointer pointing to the WB to which data is written earliest among WBs in which data is stored. If the WB pointed to by the WB_TOQ and that pointed to by the WB_BOQ+1 match, this means that data is stored in all of the WBs. In this case, a write to the WB is made pending even if the above described WB_HLD flag is set. If the WB_HLD flag is set, and if the values of these two pointers are different, a WB_GO signal is set to ON, and the data write from the STP to the WB is made.

A comparison between addresses stored in the WB_BOQ_AAR storing unit 46 and the WB_BOQ_STAAR storing unit 47, which are shown in FIG. 4, is made by the address comparing unit 48. If the two addresses match, it is determined that the WB to which data is written last time and the WB to which data is to be written this time match, so that a data write to the WB pointed to by the WB_BOQ is enabled. Namely, if the WB pointed to by this pointer is empty, or if no merging prohibition factor from the STP side for the last store, or from the WB side for the succeeding store exists, the data write to the WB pointed to by the WB_BOQ is made.

In the meantime, if the addresses stored in the two absolute address storing units 46 and 47 mismatch, or if any merging prohibition factor exists, the data write is made to the WB pointed to by the WB_BOQ+1.

For the WB to which a write is to be made, a clock enable (CE)_WB0~4_1TC is set. This flag is used to determine a WB when data is actually written to the WB on the next cycle. Furthermore, the value of WB_GO_STP is transmitted to WB_GO_1TC_STP as a pointer pointing to a data portion of an STP to which the data is to be actually written on the next cycle, and used to select data from the STP when the data write is actually made.

That is, data is selected from the data portion of the STP pointed to by the WB_GO_1TC_STP on the next cycle, and the selected data is transmitted to data registers (WBDRs) 0 to 4 within the write buffer. For the WB to which the data is to be written, the above described CE_WB0~4_1TC is set, and the data stored in the STP is correctly written to the WB to which the data is to be written with this flag.

In FIG. 3, the instruction unit (IU) 20 transmits a store request to the storage controlling unit (SU) 25 in correspondence with a store instruction, determines the assignment of the store request to the store port indicated by the next counter 23, and transmits the number of the store port to the STP assigning unit 30. In FIG. 3, two requests are simultaneously transmitted.

At the same time, the assigned store port number is notified to a store request managing unit within the reservation station 22 which manages instruction execution status. Additionally, the used counter 24 is incremented by the number of assigned store instructions. If the value of the used counter 24 reaches the number of store ports, 10 in this case, a new store request cannot be transmitted to the storage controlling unit 25.

In the store buffer unit 26 within the storage controlling unit 25, store buffer operation code (STB_OPC) of 7 bits [6:0] indicating the type of a store request is set for an STP in correspondence with the type of the store request received from the instruction unit 20. This code is a code in which any one of the 7 bits becomes "1" so as to identify 7 types of store requests. Meanings of the bits of this code are as follows.

[0]: ST (store). Indicating a normal store instruction.

[1]: FS (fetch and store). Indicating an instruction to cause a process to be performed without passing a cache line to other CPUs so as to prevent data from being rewritten by the different CPU from an instruction fetch till storage completion, like a compare and swap (CAS) instruction.

[2]: Partial store. Indicating a process for storing data only in one or more portions of designated byte in an 8-byte area.

[3]: Block store. Indicating a 64-byte block store. If this code is specified, a data write is made to a cache when a cache hit occurs as an exclusive type, or the data write is made to a main storage while invalidating a hit cache line when a cache hit occurs as a shared type. If a cache hit does not occur, a block store for writing data to the main storage is performed.

[4]: Block commit store. Indicating a 64-byte block store, by which a data write is made to the main storage regardless of whether or not a cache hit occurs, and a hit cache line is invalidated if a cache hit occurs.

[5]: ASI_SU_WT. Indicating a write to a register within a primary cache etc. by using address space identifier (ASI) specification. By specifying an ASI, a control register of the cache can be rewritten, and a special instruction can be assigned. By way of example, a memory access is normally made by specifying an address according to the contents of a translation look aside buffer (TLB). The contents of a TLB can be rewritten by a special ASI.

[6]: ASI_SX_WT. Indicating a write to a register, etc. within an SX (second cache and external access unit) with ASI specification.

In the store buffer unit 26 shown in FIG. 3, an instruction ID (IID) as an instruction identifier etc. is held for an STP assigned in correspondence with a store request, 2 bits "11" are set in a sequence ID (SID) for the STP, and this sequence ID is set as a flag indicating that the STP is valid. Additionally, a WB_HLD flag for an STP is set as a flag indicating that the STP needs to write the data to a WB. This flag is reset when a data write to a WB is completed or when the need for writing data to a WB is eliminated.

Furthermore, the storage controlling unit 25 holds the above described ASI, STB_OPC indicating the type of the store request, ADRS [4:0] as a portion of the address of the store instruction, and LENGTH [3:0] indicating the operand length of the store instruction, which are transmitted with the store request received from the instruction unit 20.

Then, a byte mark BM [7:0] which indicates the position of a byte to be stored in an 8-byte boundary is set according to the first address and the operand length of the store instruction. In the byte mark, "1" is set for the bit corresponding to the byte in which data to be stored exists among the bits respectively corresponding to the 8 bytes. If the store instruction corresponds to the first store of the above described block store instruction, a BST_1ST flag is set. Or, if the store instruction corresponds to the last store of the above described block store instruction, a BST_LAST flag is set.

The IID received from the instruction unit 20 is an identifier which indicates the execution order of all of instructions including not only a store instruction, but also branch, arithmetic, load instructions, etc. This identifier is also held by an STP, used to determine the execution order of load and store instructions so as to suspend the load instruction or to directly load data from the STP.

The storage controlling unit 25 passes a store request to a pipeline upon receipt of the store request, verifies whether or not an exception occurs in correspondence with the store instruction, and notifies the instruction unit 20 of a result of the verification. Then, a post status valid (PSTV) flag is set regardless of whether or not an exception occurs. When this flag is set, this means that detection of an exception that can be detected by the pipeline is completed by the storage controlling unit 25, and also means that the correspondence between a virtual address and a physical address is obtained in correspondence with the store instruction according to a search result of the TLB, etc.

If an exception occurs, 2 bits "10" are set as an SID for an STP, and used as a flag indicating that the exception occurs. Then, a WB_HLD flag is reset by recognizing that the need for writing data to the cache is eliminated for the STP. This prevents a write buffer from being used wastefully.

When a store request is passed to the pipeline, also a TLB or cache tag search is made. If it is proved that a cache line as an exclusive type exists as a result of the cache tag search, a line ID (LID) flag corresponding to the STP is set in order to indicate the existence of the cache line. This flag is reset when the cache line is flushed from the cache before a data write to the cache is completed. Furthermore, an operand way (OPWAY) [1:0] indicating a cache hit way is set.

If the store request is a store instruction for a page having a side effect (SE) attribute as a result of the TLB search, a TLB_SE flag corresponding to the STP is set, and store data merging before and after this request is prohibited. The SE attribute means a control for causing an instruction to be executed in order when a side effect, namely, an extra action can possibly occur, that is, when the instruction must be really executed in terms of an execution order.

If the store request is proved to be a store instruction for a page having a non-cache (NC) attribute as a result of the TLB search, a TLB_CP (cachable physical) flag is reset to "0". This non-cache attribute means the attribute of an access made not to the cache but to an I/O area.

Furthermore, if the store request is a store for which little endian is instructed as a result of the TLB search, a TLB_LE flag is set. For the STP for which this flag is set, a store operation is performed in the form of the little endian.

When store data is prepared on the side of the arithmetic unit 11 shown in FIG. 2, the data is transmitted to the storage controlling unit 25 shown in FIG. 3, and at the same time, the number of an STP 29 in which the store data is to be stored is instructed from the instruction unit 20. On the side of the SU 25, the transmitted store data is stored in the data portion within the STP 29, and an RSTDV (receive store data valid) flag indicating that the store data is received is set.

There may be a case where a branch or an exception occurs in an instruction queue preceding a store instruction by the time that the store instruction is completed, and the execution of the store instruction must be aborted. In such a case, the instruction unit 20 transmits a signal which instructs the cancellation of the store instruction to the SU 25. The SU 25 sets to "01" the SID for the STP 29 which does not receive a commitment as an execution permission of the store instruction, and the SID is used as a flag indicating that the instruction is canceled. Since there is no need to write the data within the STP 29, for which the instruction is canceled, to the cache or the main storage, the data is not written also to a WB. Accordingly, also a WB_HLD flag is reset at the same time.

Furthermore, in correspondence with the cancellation instruction from the IU 20, the STB controlling unit 28 sets a temporary flag indicating that the cancellation instruction is received. If a store request is received when this flag is set, a post cancel (POST_CAN) flag for the corresponding STP is set, and at the same time, the above described temporary flag is reset. If two or more store requests are received when the temporary flag is set, the post cancel flag of the STP which corresponds to the earlier store request is set.

In this way, the post cancel flag is set only for the STP corresponding to the store request that is first received after the cancellation instruction is received from the IU 20. For the STP for which the post cancel flag is set, there is a great possibility that the store instruction becomes a different flow from the flow of the instruction execution until at that time. Therefore, merging with a preceding store instruction is prohibited as will be described later.

When the instruction unit (IU) 20 completes the transmission of store data to the SU 25, and receives the notification that an exception does not occur for the store instruction, IU determines that the store instruction may be executed when all of instructions preceding the store instruction are completed. This is the commitment of a store instruction, and a data write to the cache or the main storage is permitted in correspondence with the committed store instruction.

When the commitment condition of the store instruction has been prepared, the IU 20 transmits a notification that the store instruction is committed to the SU 25, and also transmits the IID of the committed store instruction along with the notification. The SU 25 determines to which STP the store request is committed by making a comparison between the IID held by the STP and that of the committed store instruction, and sets a READY flag for the committed STP.

A data write is made to WBs sequentially from an STP which a store request is assigned to and data is stored in earliest among STPs for which READY and WB_HLD flags are set. A WB at a write destination is determined by using the values of the WB_BOQ and a store address as described above.

An STP in which data is stored is freed up the moment when the stored data is written to a WB. The number of freed up STPs is notified from the SU 25 to the IU 20 by a store port to free (SPTOFREE) signal indicating that an STP is freed up. STPs are freed up sequentially from an STP to which a store request is assigned earliest. If there is an STP whose store request is canceled halfway or whose exception is detected, a plurality of STPs can be simultaneously freed up. In FIG. 3, 3 STPs are simultaneously freed up.

The IU 20 that receives the store port to free signal verifies the number of freed up STPs according to this signal, and decrements the value of the used counter 24.

In association with a data write from an STP to a WB, some flags are passed from the STP to the WB unchanged, and some other flags are generated from the statuses of flags of the STP, and transmitted to the WB. If data merging is made in the WB, also bit information of the flag merged with the values written to the WB last time exists. Such flag passing/reception will be further described later.

Flags in a WB are described next. The following flags are further used in the WB.

VAL flag: This flag indicates that a WB is valid. Since data written to a WB is data stored in an STP that receives a commitment, the VAL flag of the WB corresponds to SID=11 in the STP, and also to the state where the the PSTV, the RSTDV, and the READY flags are set. This flag is set when a WB is assigned in correspondence with a data write from an STP, and reset when the WB is freed up upon completion of the data write from the WB to the cache.

XCPTN (exception) flag: This flag is set if a store area does not exist in the main storage.

OPHLD_FLAG: This flag is set until completion of a store operation if the store operation must be performed in a cache area.

SXHLD_FLAG: This flag is set if a request of a write to a register, etc. must be made to the secondary cache side. This flag is reset when the request is transmitted to the secondary cache.

SXEWT_FLAG (SX end wait flag): This flag is set if a WB should not be freed up until a notification that a write operation is completed is received from the SX (secondary cache) side in correspondence with the data write operation requested of the SX (secondary cache). This flag is reset upon receipt of the notification.

SUASI_FLAG: This flag is set if a data write to a register within the SU (storage controlling unit) 25, etc. must be made. This flag is reset when a request to write data is transmitted to the register, etc.

LID: This flag is described above, and indicates that a cache hit occurs as an exclusive type. A write to the cache is made after this flag is set.

ST1_KICK: For a WB for which an LID is not set, the LID must be set by bringing a cache line at a write destination into the cache. A pipeline operation for this operation is an ST1, and this flag indicates the state where the ST1 is waiting to be invoked. With this flag, a request to perform the ST1 operation can be made to the pipeline only in the case of necessity.

OPWAY [1:0]: This flag is described above, and indicates in which cache way a cache line to be stored exists. A meaningful value is held only when the LID is set.

LBS_BANK [3:0]: This flag indicates in which bank a data store is performed, since a local buffer storage (LBS) of the primary cache is divided into four 8-byte banks in this preferred embodiment. Because two requests are simultaneously executed in a main pipeline, this flag is used to detect a bank conflict between a cache store and another operation. This flag is set when a data write from an STP to a WB is made. If data merging is made in a WB, a plurality of bits are set.

BST_1ST: This flag is described above, and set in a WB that is the beginning of a block store. If this flag is set, data merging with the WB corresponding to the preceding store is not made.

BST_LAST: This flag is described above, and set in a WB that is the end of a block store. For a WB for which this flag is set, data merging with the succeeding store request is not made.

NOMRG (no merge): This flag indicates that data merging with a WB for which this flag is set is not made. This flag is set when data corresponding to a store request, in which the above described TLB_SE flag is set on the STP side, is written to a WB.

J8B_EVN (even): This flag is set when a data store for all of byte positions of the first half 8 bytes in a 16-byte boundary address must be performed. When this flag is set, a store is instructed to be performed by ignoring a data error even if the error that cannot be corrected exists in an 8-byte store target area within the cache. This is because correct data and an ECC can be stored irrespective of the data before being stored and the state of the ECC if a full store of 8 bytes is performed by providing the ECC of data in units of 8 bytes in this preferred embodiment.

J8B_ODD (odd): This flag is set when a data store for all of byte positions of the latter half 8 bytes in a 16-byte boundary address must be performed.

DIS_ST_EVN (disable store even): This flag indicates the prohibition of a partial data store for the first half 8 bytes in a 16-byte boundary address. If a data error that cannot be corrected exists when such a partial store is performed, the error remains even after the data write is made. Therefore, a data write is prohibited.

DIS_ST_ODD: This flag indicates the prohibition of a partial data store for the latter half 8 bytes in a 16-byte boundary address.

ASI[7:0]: This flag is described above, and indicates an address space identifier.

QBM (quad byte mark) [3:0]: This flag indicates the existence position of bytes to be stored in units of 4 bytes.

BM[15:0]: This flag indicates the position of a byte to be stored in units of 1 byte.

INH_SFB (inhibit store fetch bypass): Store fetch bypass (SFB) means that store data is bypassed before being written to the cache, and passed, for example, to an arithmetic pipeline. The SFB is prohibited from an STP or a WB for which this flag is set.

THREAD_ID (thread ID): This is a flag existing in an STP or a WB when an operation in a multithread mode is supported, and indicates from which thread an assigned store request is issued.

WB_OPC: This is an operation code indicating the type of a store operation in a WB, and available as an opcode which is encoded and held, and used for a request for the SX, etc. unchanged. Encoded values have the following meanings.

WB_OPC=00: ST, which indicating a normal store to make a write to the primary cache.

WB_OPC=01: FS (fetch and store), which indicating a store with lock control for processing a cache line specified by the above described CAS instruction, etc. without passing the cache line to a different CPU.

WB_OPC=06: Indicating the above described block commit store.

WB_OPC=07: BLK_SX_ST, which indicates a block store in the secondary cache, etc.

WB_OPC=18: OP_NC_WT (operand non-cachable write), which indicates a write of 0 to 16 bytes to a non-cachable area such as an I/O area, etc.

WB_OPC=19: OP_NC_BW (operand non-cachable block write), which indicates a block store in a non-chachable area.

WB_OPC=1D: ASI_SX_WT, which indicates a write request to an ASI register within an SX, etc.

WB_OPC=1F: ASI_SU_WT, which indicates a write request to an ASI register within the SU, etc.

A code for prohibiting the flush of a cache line among such operation codes is further described. Normally, an LID is reset when a store target cache line is flushed from the primary cache. However, instructions that require to prohibit the flush of a cache line from the completion of a fetch till the completion of a store exist, like the above described fetch and store (FS) such as the CAS instruction, etc.

A dedicated opcode is provided by both of an STP and a WB for such instructions, and its contents is passed from the STP to the WB depending on need. As described above, if STP_OPC[1] in the STP is "1", or if 5 bits of WB_OPC in the WB is "00001", the instruction is proved to be the FS. When data is fetched by the FS instruction, the LID and the above described PSTV (post status valid) are set on the STP side. Thereafter, the flush of a corresponding cache line is prohibited until completion of the data store from the WB to the cache.

Upon completion of the data write from the WB to the primary cache, the above described OPHLD_FLAG is reset. When a request of a write to a register within the SU, etc. is made based on ASI specification, the above described SUASI_FLAG is reset. Additionally, when a request of a write to a register within the secondary cache, etc. is made, the above described SXHLD_FLAG is reset.

Furthermore, the above described SXEWT_FLAG is reset when a completion notification reaches from the secondary cache side in correspondence with a store request which must wait for a process completion reply from the secondary cache side.

When all of these 4 flags are reset, the process in the WB is determined to be completed, and the WB is freed up. Then, a WBTOFREE (write buffer to free) signal is generated, and information of management resources in the WB is updated. This signal is a signal closed within the SU 25 shown in FIG. 3, and is not notified to the IU 20.

As described above, in this preferred embodiment, STPs and WBs, in which an address and data corresponding to a store request are stored, are arranged within the SU 25 shown in FIG. 3, and data is stored in an order from an STP to a WB, and from the WB to the cache. If memory latency which indicates reply performance of a memory varies with a change in the configuration of a memory system, the number of WBs is changed without altering the number of STPs, so that the number of store requests to stay in the SU 25 can be adjusted according to the memory latency without changing the circuitry configuration of the IU 20 side. As a result, the degree of freedom of a design significantly increases. Note that the memory latency indicates a time period from when a request is made to the memory till when data is input/output.

A store request that can be made to stay in a WB is limited to a store request that receives a commitment. Therefore, if the number of store requests before being committed, namely, the number of inflight store requests, which are currently being executed but are uncertain to be really executed, is desired to increase, the number of STPs may be increased. Note that the number of STPs can be increased/decreased according to the performance of the instruction processing device (IU).

FIG. 5 shows flags used on the store port and the write buffer sides. As described above, some of the flags are passed from an STP to a WB unchanged. Examples of such flags include OPHLD_FLAG, LID, BST_1ST, BST_LAST, OPWAY[1:0], ASI[7:0], INH_SFB, THREAD_ID, and the like.

Additionally, some of the flags are generated from the statuses of flags in an STP, and transmitted to a WB. Example of such flags include SXHLD_FLAG, SXEWT_FLAG, SUASI_FLAG, NOMRG, WB_OPC[4:0], and the like.

Furthermore, examples of flags, by which bit information can be possibly merged when data merging is made in a WB, include J8B_EVN, J8B_ODD, LBS_BANK[3:0], QBM[3:0], BM[15:0], and the like.

Flags marked with circles among the flags on the write buffer side in FIG. 5 are flags used only by a process of a write to the cache or the memory, namely, flags used only on the write buffer side. As in this preferred embodiment, if an increasing store request is attempted to be processed by increasing only the number of STPs without making a distinction between an STP and a WB, all of the flags marked with the circles, which are required only on the write buffer side in FIG. 5, must be managed also for all of store ports. However, since flags that may be possessed only on the WB side exist in this preferred embodiment, the number of control flags can be decreased as a whole in order to cope with the above described case, and a control logic can be downscaled. Explanations on flags in FIG. 5, which are irrelevant to the present invention, are omitted.

Store-in and store-through processing methods in this preferred embodiment are described next with reference to FIG. 6. Normally, with the store-in method, store data is written to a cache memory in the hierarchy closest to a central processing unit, namely, the primary cache. In the meantime, with the store-through method, data is written to both of the primary and the secondary caches if a store target area exist in the primary cache, or the data is written to only the secondary cache if the store target area does not exists in the primary cache.

In FIG. 6, with the store-in method, store data stored from an STP 29 to a WB 35 within the SU 25 is written to a primary cache 81.

In the meantime, with the store-through method, data is similarly written to the primary cache 81 if a store target area exists in the primary cache 81, and at the same time, the data stored in the WB 35 is stored also in a secondary cache 83 within a secondary cache device (SX) 82 regardless of whether or not the store target area exists in the primary cache.

At this time, if a WB 84 for temporarily holding data from the SU 25 is comprised on the SX side, the data is stored in an order from the WB 35 to the WB 84, and from the WB 84 to the secondary cache 83. Finally, the data is stored in the secondary cache 83 without fail.

Both of the store-in and the store-through methods are used in some cases. In such a case, either of the methods is used according to specification based on the page attribute resultant from the above described TLB search, or specification with an ASI for each instruction.

Data merging in a WB is further described by using the above described flags and FIG. 4. The WB_BOQ flag storing unit 41 shown in FIG. 4 holds WB_BOQ_VALID and WB_BOQ_NO_MERGE flags. The WB_BOQ_VALID is a flag indicating that valid data is stored in the WB pointed to by the WB_BOQ pointer. This flag is output to the merge checking unit 44.

The WB_BOQ_NO_MERGE is a flag which prohibits data merging for a succeeding store request. This flag is left as information on the STP side which makes a data write to a WB last time. This information is left in any of the following cases: (1) in a case other than STB_OPC=ST (OPC[0]=1) or, STB_OPC=PS(OPC[2]=1), (2) in the case where a side effect flag is set (STB_TLB_SE=1), and (3) in the case where a store request is a store in a non-cachable area (STB_TLB_CP=0).

If a block store request for the secondary cache (SX) is performed, namely, if STB_OPC[3]=1 or STB_OPC[4]=1, STB_OPHLD=0, and STB_BST_LAST=0, the NO-MERGE flag is reset, and forcible merging is made.

The WB_GO flag storing unit 42 shown in FIG. 4 holds flags used at the timing of WB_GO for the STP that is selected by the above described PRE_WB_GO_STP pointer beforehand. A WB_GO_NEW_ALLOC flag exists among them. This flag is used also when data merging for a preceding store request is prohibited. This flag is held as information about an STP from which a data write is to be made to a WB this time.

This information is set in any of the following cases: (1) in the case where the state of a selected STP is other than STB_OPC=ST(OPC[0]=1) or, STB_OPC=PS(OPC[2]=1) (2) in the case where the side effect flag is set (STB_TLB_SE=1), (3) in the case where a store request corresponds to a store request in a non-cachable area (STB_TLB_CP=0), and (4) in the case where merging is instructed to be prohibited by instruction cancellation (POST_CAN=1).

However, if a block store other than the first store is performed, namely, if STB_OPC[3]=1 or STB_OPC[4]=1, and STB_BST_1ST=0, a WB_GO_NEW_ALLOC flag is reset, a new WB is prohibited from being assigned, and forcible data merging is made. This is because a block store is not successfully performed if data merging cannot be made. Therefore, the data merging is enabled.

If either of the WB_BOQ_NO_MERGE and the WB_GO_NEW_ALLOC flags is set, an INH_MERGE signal as a signal which prohibits merging for a data write to a WB is set to ON by the merge condition verifying unit 43 shown in FIG. 4, and output to the merge checking unit 44.

Additionally, whether or not an address corresponding to the data attempted to be written from the STP to the WB and that corresponding to the data of the WB pointed to by the WB_BOQ match is checked by making a comparison between the addresses stored in the WB_BOQ_AAR storing unit 46 and the WB_GO_STAAR storing unit 47. Its result is output from the address comparing unit 48 to the merge checking unit 44 as an address match signal. The merge checking unit 44 determines whether a write is made either to the WB pointed to by the WB_BOQ or to the next WB (WB_BOQ+1) according to the WB_BOQ_VALID, the INH_MERGE, and the ADDERSS_MATCH signals.

A process for a data error is described next. If a data error is detected, and if it is a 1-bit error, a cache protocol for an error process correcting a 1-bit error is invoked. As a result, the error is corrected and operations are continued. If the error is a 2-bit error, the operations cannot be continued in some cases.

Assume that a 2-bit error is detected in a certain 8-byte block in the cache, and a data store is attempted to be performed for the whole of the 8 bytes, in this case, an ECC is generated from the store data, and the value of the 8-byte block including the 2-bit error before the store is ignored. There is no problem at this time if the error is left uncorrected.

Also assume that a 2-bit error is detected in a certain 8-byte block in the cache, and a data store is attempted to be performed for the whole of the 8 bytes, in this case, the error is not corrected unless the store is performed for the whole of the 8 bytes. As the case where a store is not performed for the whole of 8 bytes, for example, the case where a store operand length is less than 8 bytes, such as 1, 2, or 4 bytes can be cited.

Furthermore, if a partial store (STB_OPC[2]=1) is specified as described above, there is a possibility that the store is not a store for the whole of the 8 bytes, but a store for some specified byte positions even though the store operand length is 8 bytes. Also this case can be handled as the case where the store is not performed for the whole of the 8 bytes.

If an error remains after the data store is performed in a store target area, execution of the store itself is aborted. The reason is that the result is not improved if the store is executed, and an error can be possibly detected after the store is executed. The store execution when a 2-bit error is detected is controlled by DIS_ST_EVN and DIS_ST_ODD flags for each WB.

A write enable signal is disabled on the even side, namely, for the first half 8 bytes in a 16-byte boundary if the former flag is set, or on the odd side, namely, the latter half 8 bytes in the 16-byte boundary if the latter flag is set, so that the data write is prohibited.

These flags are set when an ST1 process for the above described pipeline is performed by the storage controlling unit. All of WBs that miss the cache, namely, whose LIDs are "0", can request the ST1 process. By the ST1 request, whether or not a store target block exists in the cache as an exclusive type is checked, and at the same time, whether or not a 2-bit error exists in a 16-byte area including the store target area is checked.

If no error exists and a cache hit occurs, the LID is set, and the data store is performed when a write order comes, namely, when the WB is pointed to by the WB_TOQ pointer.

If an error is detected although a cache hit occurs, the LID is not set. Either or both of the above described two flags are suitably set only if a 2-bit error is detected as a result of the ST1 process performed by a store request corresponding to the WB_TOQ.

Here, the reason that the WB for which these two flags can be set is limited to the WB pointed to by the WB_TOQ is to prevent data from being garbled. The data garbling is described below with reference to FIGS. 7 and 8.

FIG. 7 shows a data store order for 5 WBs. Here, a 2-bit error exists in the first half 8 bytes of data at an address A, a full store of 8 bytes is performed from a WB1 shown in FIG. 7, and then a partial store of 4 bytes is performed from a WB3. Assume that store data irrelevant to the address A are included in a WB0 and a WB2, and the WB_TOQ points to the WB0.

FIG. 8 explains a change in the contents of the first half 8 bytes at the address A. Initially, the case where a 2-bit error exists in the first half 8 bytes, and a WB for which a DIS_ST_EVN or a DIS_ST_ODD flag can be set in this state is limited to the WB pointed to by the WB_TOQ, namely, the left side of FIG. 8 is considered.

Since the store in the WB1 is the full store of 8 bytes, the operations of an error detecting circuit are suppressed, and an error which causes a flag to be set for a request to perform the ST1 process for the WB1 is not notified. Accordingly, the value of the LID is set for the WB1.

About that time, the request to perform the ST1 process is made to the WB3. Assuming that the preceding store for the WB1 is not completed at this time, the 2-bit error remains at the address A, and this error is detected by the request to perform the ST1 process for the WB3.

Then, whether or not the WB3 is the WB pointed to by the WB_TOQ is checked. Since the WB3 is not pointed to by this pointer at this time point, the flag for the WB3 is not set, and also the LID for the WB3 is not set due to the detection of the error.

In time, the process for the WB0 pointed to by the WB_TOQ is completed, and the data store for the WB1 is performed. A store of data stored in the WB1 is performed in the cache, namely, the full store of 8 bytes is performed, and the 2-bit error at the address A is cleared.

Thereafter, the request to perform the ST1 process is made to the WB3. At this time, the 2-bit error at the address A is already cleared, and the LID is set for the WB3. Then, the WB3 is pointed to by the WB_TOQ, and the process for the WB3 is completed, so that a data write result of the WB1 and the WB3 properly remains at the address A.

Operations, which are performed in the case where the WB for which the DIS_ST_EVN or the DIS_ST_ODD flag can be set is not limited to the WB pointed to by the WB_TOQ, are described next with reference to the right side of FIG. 8. Since the store for the WB1 is an 8-byte store, error detection is not made, and an error is not notified in correspondence with the request to perform the ST1 process for the WB1. Accordingly, the LID for the WB1 is set, and the request to perform the ST1 process is processed for the WB3 about that time.

Because the data store by the WB1 is not yet completed at this time point, the 2-bit error remains at the address A and is detected by the request to perform the ST1 process for the WB3. Inversely to the left side of FIG. 8, a WB for which a flag is set is not limited to the WB pointed to by the WB_TOQ here. Therefore, the DIS_ST_EVN or the DIS_ST_ODD flag is set for the WB3.

Additionally, since the error is detected, the LID is not set for the WB3. However, for a subsequent request to perform the ST1 process, error detection is not made for the first half side or the latter half side, for which a DIS_ST_EVN flag or a DIS_ST_ODD flag is set, so as to prevent the process from being hung up due to an error that is again detected by the request.

After the DIS_ST_EVN or the DIS_ST_ODD flag is set, the LID for the WB3 is set if only a cache line exists as an exclusive type regardless of whether or not the process for the WB1 is completed, namely, whether or not the 2-bit error exists at the address A. In time, the process for the WB1 is completed, and the 2-bit error at the address A is cleared by the full store of 8 bytes for the WB1.

Then, the WB3 is pointed to by the WB_TOQ, and the process for the WB3 is performed. However, if attempts are made to write the contents of the WB3 to the cache, the content of the Address A is not updated. This is because the DIS_ST_EVN or the DIS_ST_ODD flag is set. Therefore, a malfunction such that only the result of the data write of the WB1 remains at the address A, and a malfunction that a data write of the WB3 disappears occurs.

To prevent such a malfunction, setting of the DIS_ST_EVN or the DIS_ST_ODD flag, which determines the prohibition of a store, is limited to the store request from the WB pointed to by the WB_TOQ, namely, only the earliest store request.

The above described store fetch bypass (SFB) is further described next. If an area to be processed by a preceding store request is a target to be processed by a succeeding data fetch request, data before being stored is erroneously fetched if the fetch request is processed before the data is written to the cache by the store request.

This is a malfunction of skipping a store operation. In such a case, store fetch interlock (SFI) is recognized to occur, and the fetch request must be performed after the process of the preceding store request associated with the area to be processed is entirely completed. Therefore, if the area to be processed is same for both a store request and a fetch request, the process of the fetch request is made to wait until the preceding store is completed. If the preceding store causes a cache miss, it takes a time to complete the store instruction. Therefore, also the process of the fetch request is made to wait for a long time.

Such a phenomenon becomes problematic as a performance degradation factor of a data processing device. If contents of registers are moved between a floating-point register and a general-purpose register within a central processing unit, contents of one of the registers is written to the memory, and the data read from the memory is stored in the other register, so that the contents of the register is moved. In such a case, there is a great possibility that an SFI occurs.

Additionally, if the capacity of a register of the central processing unit becomes insufficient, the contents of the register is saved in the memory, and the data is rewritten from the memory to the register when the insufficiency is resolved. An SFI can possibly occur also in such a case.

Such a problem frequently occurs depending on the type of a program executed by the central processing unit. To prevent performance degradation caused by the SFI in such a case, control such as a store fetch bypass (SFB), or store data forwarding (SDF) is introduced in some cases.

With such a control, a data fetch can be performed by passing data in a store port to a fetch request before the data is written to a write buffer, namely, by bypassing the write buffer or the cache. How to perform a process for the SFB in the preferred embodiment which introduces a WB is described below.

Figure 9:
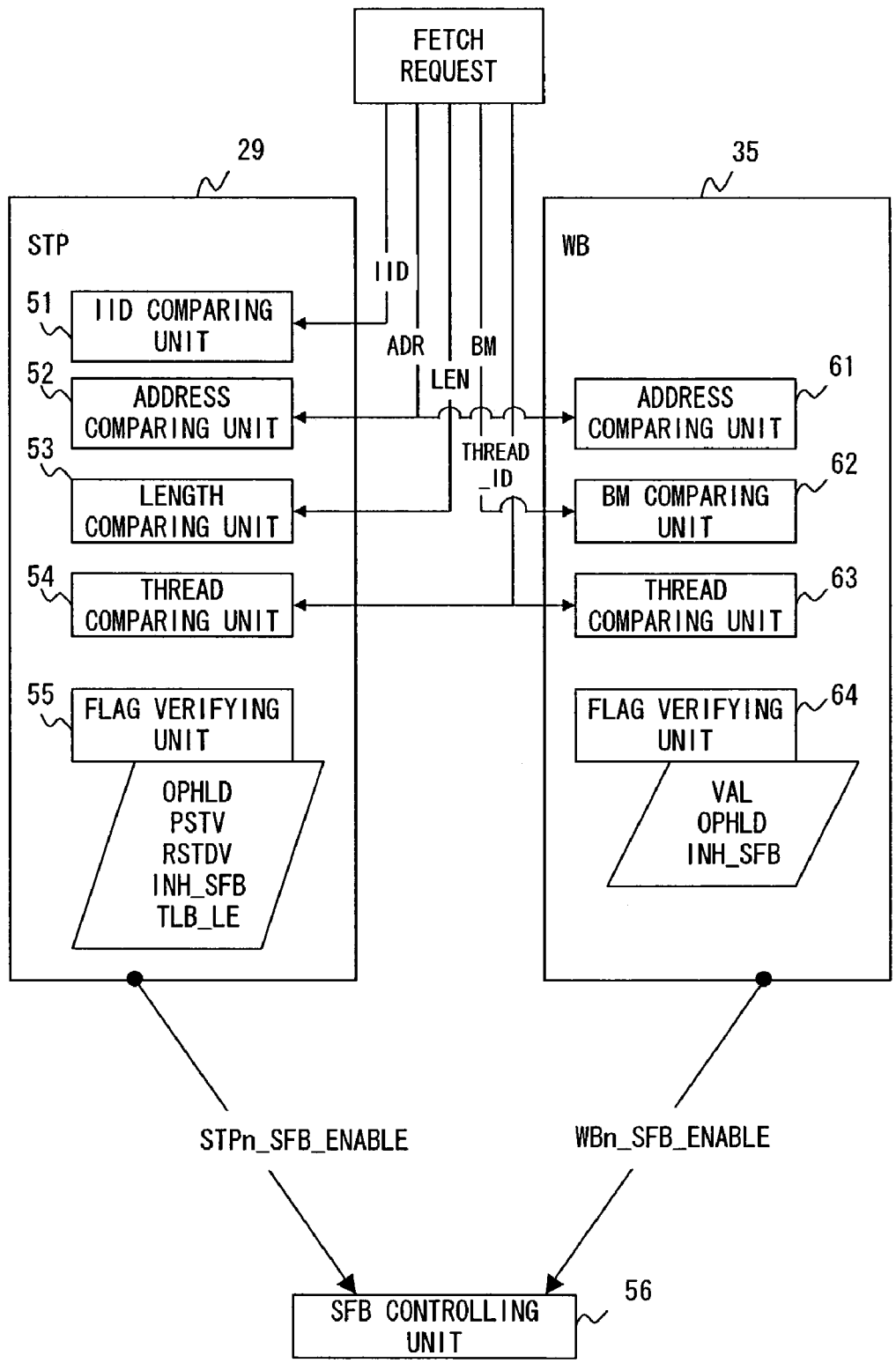
FIG. 9 explains a store fetch bypass controlling method.

FIG. 9 explains a store fetch bypass controlling method. The left side of this figure explains a store fetch bypass controlling method from a store port. An SFB from an STP 29 is permitted if all of check results of an IID comparing unit 51, an address comparing unit 52, a length comparing unit 53, a thread comparing unit 54, and a flag verifying unit 55 are OK.

The IID comparing unit 51 verifies that a store instruction precedes a fetch instruction in terms of an instruction execution order. To make the verification, a comparison is made between an IID held by each STP and that of the fetch request which flows through the pipeline of the storage controlling unit, and a comparison result becomes OK if the IID of the STP is determined to be older.

If a READY flag for the STP is already set, the IID of the STP is determined to be older irrespective of the value of the IID. The READY flag being set means that all of preceding fetch requests are completed.

The address comparing unit 52 makes a comparison between an address corresponding to a store request held by each STP and that corresponding to a fetch request which flows through the pipeline, and makes a comparison result OK if both of the addresses match.

The length comparing unit 53 makes a comparison between the length of data of the store request, which is held by the STP, and that of the data corresponding to the fetch request which flows through the pipeline, and makes a comparison result OK if both of the lengths match.

The thread comparing unit 54 makes a comparison between the ID of the thread corresponding to the store request held by the STP, and that of the thread corresponding to the fetch request which flows through the pipeline, and makes a comparison result OK if both of the IDs match.

Here, a thread ID is a flag indicating from which thread a store request for an STP is issued. This is used to prevent a total store order (TSO) violation which occurs by extracting store data from a different thread side when a multithread is supported. Additionally, thread IDs are respectively held by an STP and a WB as described above.

The flag verifying unit 55 verifies the above described OPHLD, PSTV, RSTDV, INH_SFB, and TLB_LE flags. Here, the OPHLD is a flag instructing a write of STP data to the cache. If this flag is not set, an exception exists, or the store request corresponds to a non-cachable store. Therefore, this store request does not become an SFB target.

The PSTV is a flag indicating that the presence/absence of an exception is already notified to the instruction unit, and that a physical address corresponding to a store request is learned. Since a physical address match is included as a condition for executing the SFB, the PSTV flag is required to be set in order to execute the SFB.

The RSTDV is a flag indicating that store data has been received from the arithmetic unit. To extract data from an STP by store fetch bypass, the store data should exist as a matter of course. The RSTDV flag is required to be set in order to execute the SFB.

The SFB from an STP for which INH_SFB is set is prohibited. As to a store request for which flags other than STB_OPC[0] are set to ON, this flag is set. To execute the SFB, this flag is required to be reset.

The TLB_LE is a flag indicating that a store must be performed with a little endian. Since the frequency of an access with the little endian is low, and processes are attempted to be simplified, an STP using the little endian is not included as an SFB target in this preferred embodiment. Accordingly, the TLB_LE flag must be reset to execute the SFB.

An STP that satisfies all of the above described conditions becomes an SFB target. A result of checking whether or not an STP becomes an SFB target is collected from each STP to an SFB controlling unit 56 as an STPn_SFB_ENABLE signal, and whether or not to permit the SFB is finally determined by the SFB controlling unit 56 as will be described later.

As shown on the right side of FIG. 9, all of check results of an address comparing unit 61, a byte mark (BM) comparing unit 62, a thread comparing unit 63, and a flag verifying unit 64 must become OK for a data bypass from a write buffer 35.

For the WB35, an IID comparison is not required. This is because a store request for the data stored in the WB is limited only to an STP that receives a commitment, namely, an STP for which a READY flag is set. It is evident that the store request of the WB is earlier than the fetch request without the need for making an IID comparison.

The address comparing unit 61 makes a comparison between an address corresponding to the data held by the WB, and that corresponding to the fetch request which flows through the pipeline, and makes a comparison result OK if both of the addresses match, likewise the address comparing unit 52 for the STP 29.

The BM comparing unit 62 makes a comparison between the byte mark of the data held by the WB, and that of the data of the fetch request which flows through the pipeline. If the byte mark for the fetch request is included in the byte mark for the WB, namely, if the byte marks are, by way of example, a byte mark which sets a bit in a position where data exists to ON in units of 1 byte, the data required by the fetch request is indicated to be a portion of the data stored in the WB.

If the byte mark in units of 1 byte is used to make a byte mark comparison, its determination using comparison requires a considerable amount of time, which is disadvantageous in some cases. In such a case, a quad byte mark (QBM) as a byte mark in units of 4 bytes, or a byte mark in units of 8 bytes can be used. In this preferred embodiment, a comparison using, for example, the QBM is made.

If a comparison in units of 1 byte is not made as described above, confirmation in unit of 1 byte must be finally made for an SFB candidate selected as an SFB target in the byte mark determination.

For instance, the case where a QBM is used to select an SFB candidate, and QBMs match when 4-byte and 1-byte areas are recognized as targets respectively by the fetch and the store is considered. In this case, entire fetch data does not exist in a write buffer although the QBMs match. Therefore, the SFB must be prohibited.

Accordingly, in such a case, an SFB_BOGUS signal indicating that the SFB is incorrect must be set, and the fetch request must be forcibly aborted as an SFI on the next cycle. In this way, an incorrect SFB, which can possibly occur in the case where an SFB candidate is selected without comparing all of byte marks, can be prevented.

Here, the reason why a comparison in units of 1 byte is not made to select an SFB candidate but finally made for an SFB candidate is that the process is performed in time even if this comparison is made a little later, whereas the operations for screening a candidate must be quickly performed to select data.

The thread comparing unit 63 makes a thread ID comparison likewise the thread comparing unit 54 for the STP 29.

The flag verifying unit 64 checks VAL, OPHLD, and INH_SFB flags. The VAL flag corresponds to the state where all of the READY, the PSTV, and the RSTDV flags on the STP side are set. Accordingly, only checking the VAL flag on the WB side is equivalent to the checks of these three flags.

Checks of the OPHLD and the INH_SFB flags are similar to those of the STP 29. The check of the TLB_LE flag, which is required on the STP side, is omitted in this preferred embodiment. The reason is that an SFB can be performed irrespective of an endian, and there is no need to prohibit the SFB by using the TLB_LE flag, since data alignment is completed in the WB as will be described later.

A WB that satisfies all of the above described conditions becomes an SFB target. A result of this check is collected to the SFB controlling unit 56 as a WBn_SFB_ENABLE signal, and whether or not to permit the SFB is finally determined. Namely, the SFB controlling unit 56 finally permits the SFB if the number of SFB candidates is only one in all of the STP 29 and WB 35, and an SFI factor does not exist.

A data write from a store port to a write buffer, and a data write from the write buffer to the cache memory or the main storage is further explained. In a system that can adopt a process for simultaneously notifying a store buffer unit of a commitment of a plurality of store requests from the instruction unit (IU), data of a plurality of STPs simultaneously become write targets to one or more WBs. In this case, a controlling unit controlling a simultaneous write of the data of the plurality of STPs to one or more WBs is arranged to improve the performance of the store process.

Figure 10:
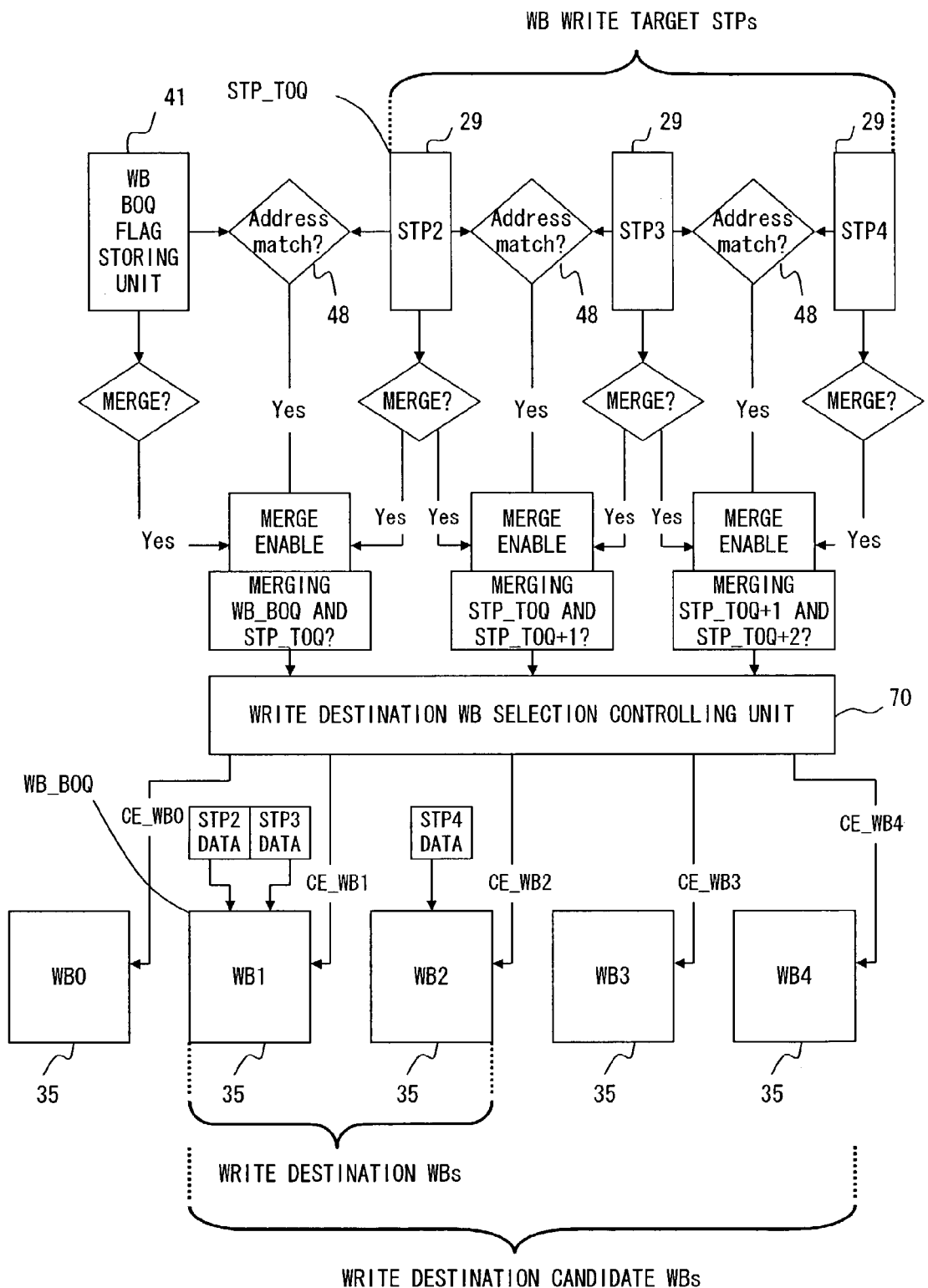
FIG. 10 explains a data writing method simultaneously writing data of a plurality of store ports to one or more write buffers.

FIG. 10 explains a data writing method using a write destination WB selection controlling unit 70 as such a controlling unit. In this figure, if data of n STPs are simultaneously written to one or more WBs, write target WBs are limited to a range of (n+1) WBs from the WB pointed to by the WB_BOQ to a WB pointed to by WB_BOQ+n.

If data of 3 STPs are simultaneously written to one or more WBs, data within the total of 3 STPs such as the STP pointed to by STP_TOQ as an STP to which a store request is assigned earliest, and the 2 STPs pointed to by STP_TOQ+1 and STP_TOQ+2 become write sources. In FIG. 10, these 3 STPs are assumed to be STP2, STP3, and STP4.

The flag that indicates whether or not to enable merging and is extracted from these 3 STPs, and the WB_BOQ flag storing unit 41 shown in FIG. 4 are used, so that whether or not to enable data merging for the preceding and the succeeding store requests is determined according to a flag condition.

Additionally, if an address match for the preceding and the succeeding store requests is determined by the address comparing unit 48, and if data merging for the preceding and the succeeding store requests is possible according to these conditions, the data merging is enabled. As a result, a signal indicating whether or not to merge, for example, data within the WB pointed to by the WB_BOQ, and data within the STP pointed to by the STP_TOQ, here, the data within the STP2 is transmitted to the write destination WB selection controlling unit 70.

The write destination WB selection controlling unit 70 then determines data of which STP is to be merged. A determination result is transmitted as a clock enable signal CE_WB0~4 to each WB to which data is to be written. Furthermore, a data selection signal is transmitted to each WB, and used to determine whether or not each WB captures the data of the STP2, the STP3, and the STP4.

In FIG. 10, the number of WBs to which the data within the 3 STPs, namely, the STP2 to STP4 are to be simultaneously written is 4. However, these are write destination candidate WBs, and WBs to which the data are actually written are 2 WBs such as the WB1 pointed to by the WB_BOQ, and the next WB2. To the WB1, the data of the STP2 and the STP3 are merged and written. To the WB2, the data of the STP4 is written. Assuming that all of these data are, for example, 8 bytes, the data already stored in the WB1 is overwritten with, for example, the data from the STP2, and the data from the STP2 and the STP3 remain in the WB1.

As described above, ST1 exists as a pipeline operation of the storage controlling unit, which is intended to check whether or not a store target cache line exists in the cache memory in correspondence with a store request. If the store target cache line is determined to exist in the cache as a result of the operation of the ST1, a LID is set as described above. On the WB side for which the LID is set, a request of ST2 as a pipeline operation for actually writing store data to the cache memory can be made.

In this preferred embodiment, the ST1 request is issued only from the WB side in order to prevent an error in flag setting or resetting when an LID is passed from an STP to a WB. As a result, a store request that can request the ST1 among store requests is limited only to a committed request, and the speed of an entire process is improved.

However, also on the WB side, the ST1 request is prohibited from being issued from the WB that is pointed to by the WB_BOQ which can possibly become a data merging target.

Figure 11:
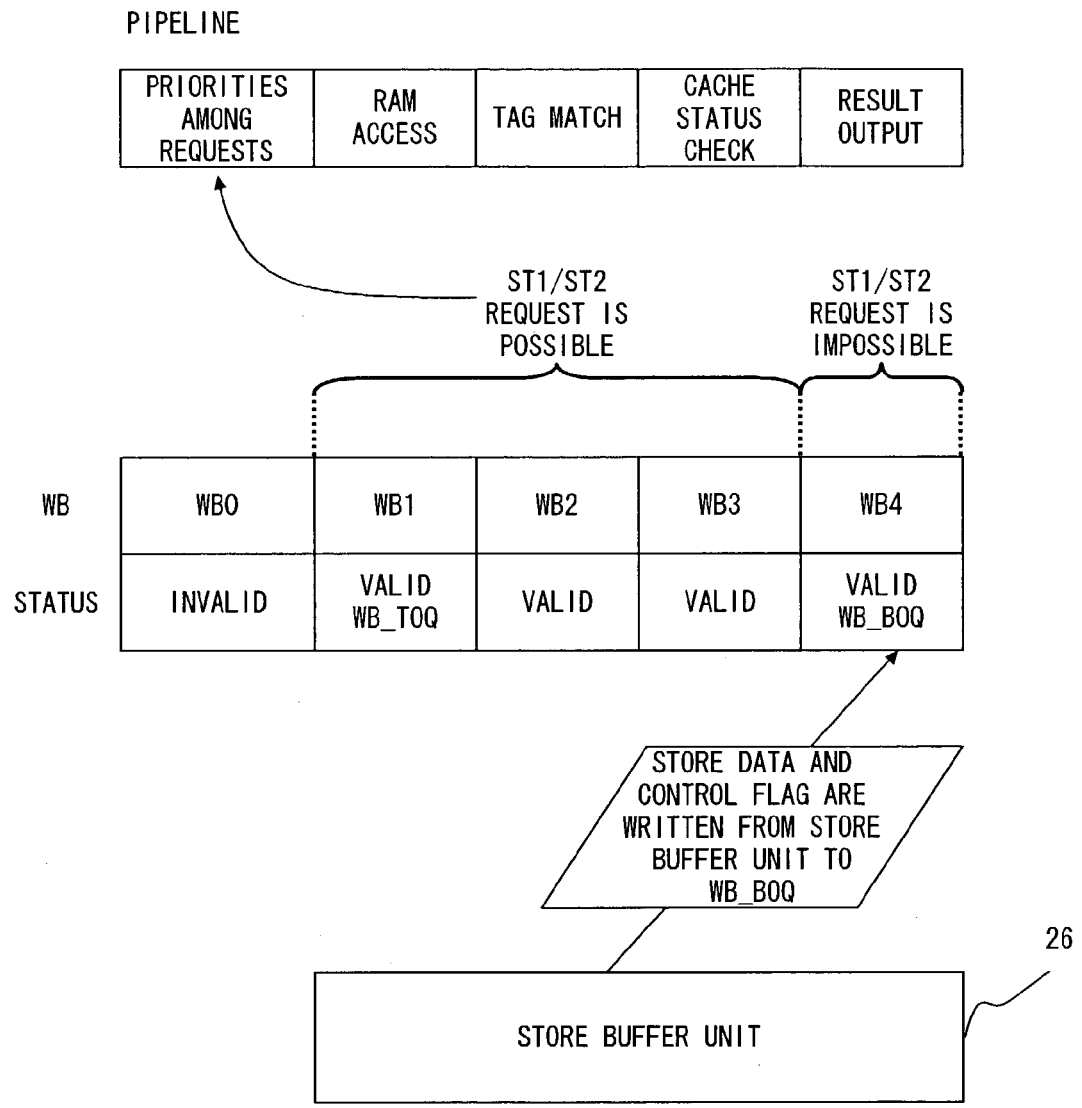
FIG. 11 explains a pipeline request on the write buffer side.

FIG. 11 explains the relationship between pipeline requests and respective WBs on the WB side. In this figure, the ST1 request is prohibited from being issued from the WB4 that is pointed to by the WB_BOQ, and can possibly become a data merging target as described above.

The reason is that an error is prevented from occurring in the value of an LID when the need of data merging arises in a data write from an STP to a WB, and the LID in the WB is attempted to be set, for example, if a condition for clearing the LID occurs (for instance, the flush of a cache line occurs) at the time of ST1 operations performed on the WB side.

Additionally, as shown in FIG. 11, also a request of the ST2 as the pipeline of a write operation to the cache memory is prohibited from being issued from the WB4 pointed to by the WB_BOQ.

For example, if a data write from a WB that is pointed to by the WB_BOQ to the cache memory or the main storage occurs when a data write is made from an STP to the WB, the store process from the WB can be possibly completed without reflecting data newly written to the WB on the contents of the cache memory or the main storage.

At this time, a phenomenon that the store data is lost for the store by which the data is attempted to be written from the STP to the WB occurs. Therefore, also a request of a write operation for the cache memory or the main storage as a request from the WB pointed to by the WB_BOQ is prohibited to avoid such a problem.

The request of the pipeline operation for writing data from the WB pointed to by the WB_BOQ to the cache memory or the main storage is prohibited as described above, which causes a problem that the data write from the WB to the cache memory or the main storage is never performed unless the WB_BOQ is updated.

Accordingly, in this preferred embodiment, the value of the WB_BOQ is forcibly updated depending on need, so that the data write from the WB pointed to formerly by the WB_BOQ to the cache memory or the main storage can be implemented.

Such a forcible update of the WB_BOQ pointer is described with reference to FIGS. 12 and 13. FIG. 12 explains the statuses, etc. of WBs which are substantially similar to those in FIG. 11.

In this figure, the status of the WB0 is invalid, namely, the WB0 is in the state where valid data is not held. In the meantime, the statuses of the WB1 to WB4 are valid. Additionally, the WB1 is pointed to by WB_TOQ, and the WB4 is pointed to by the WB_BOQ. Accordingly, requests of the ST1 and the ST2 processes are prohibited from being issued from the WB4 to the pipeline.

FIG. 13 shows the statuses of the write buffers when the value of the WB_BOQ is forcibly incremented from the state shown in FIG. 12. The WB_BOQ is updated, so that this pointer will point to the WB0. Here, the value of this pointer is only forcibly updated, and the status of the WB0 remains invalid. The requests of the ST1 and the ST2 pipeline operations are prohibited from being issued from the WB0 to the pipeline. In the meantime, the requests of the pipeline operations from the WB4 pointed to by the WB_BOQ so far to the pipeline are permitted.

The case where all of store ports are empty exists as the first case where the value of the WB_BOQ is forcibly updated. In such a case, there is no possibility that data of the succeeding store request is merged with the data of the WB pointed to by the WB_BOQ. Therefore, the data must be stored in the cache memory or the main storage immediately.

Such a state is determined by detecting that all of SIDs as signals indicating the VALID status of the respective store ports are cleared. Additionally, the case where an STP whose status is VALID exists among the store ports and the case where an STP from which a write is to be made to a WB does not exist among the store ports can be the case where the value of the WB_BOQ is forcibly updated. This state is determined by detecting that all of READY flags for the respective store ports are set to OFF.

The case where merging of store data of preceding and succeeding store requests must be prohibited exists as the second case where the WB_BOQ is forcibly updated. In such a case, the value of the WB_BOQ is forcibly updated, so that the WB in which the data of the preceding store is stored is made unpointed to by the WB_BOQ, and recognized not to be a merging target.

For example, when a merge prohibition flag is set for the WB_BOQ, the WB_BOQ is forcibly updated. As a result, a data write from the WB pointed to by the WB_BOQ to the cache memory or the main storage is quickly made.

However, if a data write from the STP side to a WB, namely, a data write to the WB pointed to by WB_BOQ+1 occurs at the same timing when the WB_BOQ is updated in the second case, the WB_BOQ is not forcibly updated. This is because the WB_BOQ is automatically updated by the write to the next WB, and a malfunction can possibly occur if this value is forcibly updated at this time.

The case where the process hangs up as described above if the contents of the WB pointed to by this pointer is not written to the cache memory or the main storage exists as the third case where the bottom of queue pointer must be forcibly updated.

The first case where the process hangs up is the case where a succeeding load instruction using the data within the WB pointed to by the WB_BOQ cannot be executed because the data is not stored. Such a case is determined by detecting that an earlier load instruction cannot be executed due to the value of the WB_BOQ, and by recognizing this phenomenon as a hang-up factor.

In this case, the value of the WB_BOQ is updated, and a data write is made from the WB pointed to by this pointer so far to the cache memory or the main memory, and the WB is freed up, so that the earlier load instruction can be executed.

The second case where the process hangs up is the case where a cache line which receives a flush request from another CPU is a store target of the data within the WB pointed to by the WB_BOQ, and this store request is a request to prohibit the flush of the cache line until completion of the store. The store request to prohibit the flush of a cache line until completion of a store as described above is a store request corresponding to the above described WB_OPC=FS (fetch and store). The above described CAS instruction, etc. corresponds to this request.

In such a case, the flush process is aborted because the flush of the cache line is prohibited by the WB having WB_OPC=FS, which is performed by the pipeline in correspondence with the flush request from the other CPU. Therefore, a retry of the flush request must be made. The number of times that the process is aborted is counted, and the value of the WB_BOQ is forcibly updated when the number reaches a predetermined number or more, so that a write operation from the WB to the cache memory or the main storage is performed. As a result, the WB is freed up, and the flush operation of the cache line can be performed.

The above described forcible update of the WB_BOQ inversely causes an inappropriate result as the case may be. As such a case, the case where a block store from an STP to a WB, namely, a collective store of 64-byte data is performed exists.

Figure 14:
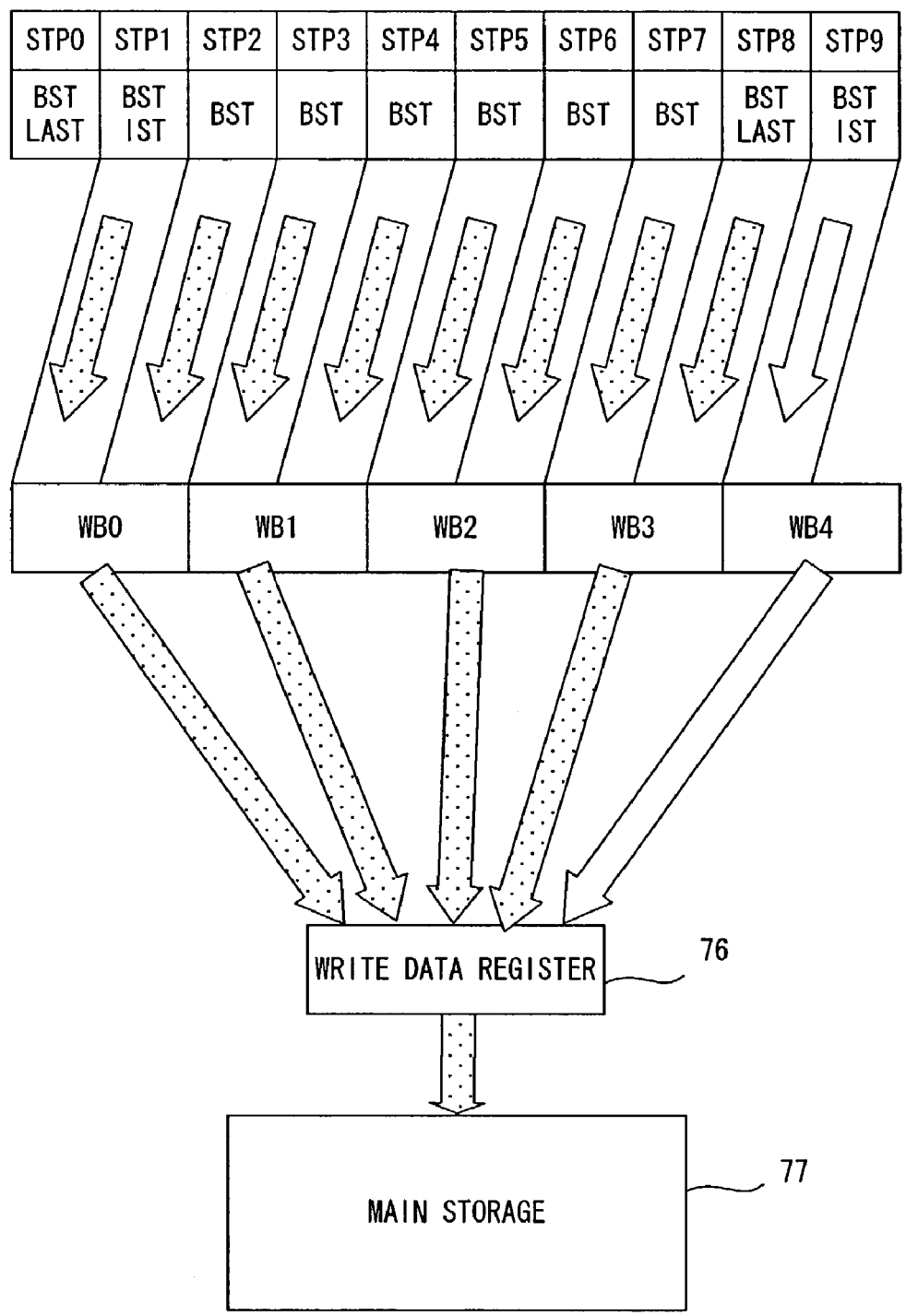
FIG. 14 explains a 64-byte block store of data.

FIG. 14 explains this block store. This block store is an instruction which is specified by an instruction code and the above described ASI, and intended to write successive 64-byte data. In FIG. 14, these 64 bytes are successively stored in an STP1 to an STP 8 by 8 bytes.

The instruction unit disassembles the 64-byte store, which is originally composed of one instruction, into 8-byte stores, which is composed of 8 instructions, and provides the disassembled stores to the SU as store requests. Since the 8-byte stores disassembled as 8 instructions are merged in WBs in the SU, they are assigned to 4 WBs.

In FIG. 14, for example, data stored in the initial STP1 and STP2 are merged and stored in a WB0. Similarly, data stored in 2 successive STPs are respectively merged and stored in a WB1 to a WB3.

Then, write data are once moved from the WBs to a 16-byte write data register 76 when the data is written, for example, to a main storage, and the moved data are written to the main storage 77 via this register. This data register is used only when data is written to the main storage, and not used when data is written to the cache memory.

However, if the above described forcible update operation of the WB_BOQ is performed in this case, the 8-byte data are not merged in the WBs when a write is made from the STPs to the WBs. For example, the data are stored in the first half or the latter half 8 bytes of the next WB, and an operation for writing the successive 64 bytes to the 4 successive WBs cannot be performed.

Accordingly, a data existence pattern of a block store becomes complex, and a data selection operation performed by the write data register 76 becomes complex also for the data write to the main storage 77. Additionally, WBs whose number is 4 or more in this case, and which are required by a block store instruction are used, whereby WB resources is used up, or process efficiency is decreased.

Therefore, control for suppressing the forcible update operation of the WB_BOQ is performed while data of a block store is written to a WB. This control is implemented by resetting the above described WB_GO_NEW_ALLOC flag when data of a portion other than the first 8 bytes, namely, BST_1ST is written to the WB.

With this control, a new WB is assigned only to the BST_1ST, and the other data are sequentially stored in the respective WBs in correspondence with an address under a condition where merging is permitted. Fundamentally, an address can be assigned in units of 1-byte of data. However, an address is assigned in units of 8 bytes in this preferred embodiment.

Figure 15:
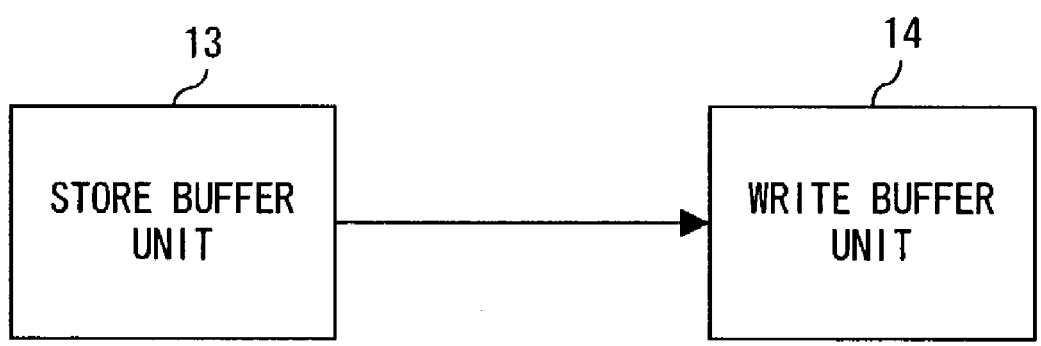
FIG. 15 explains a write buffer application method (No. 1) for use in a data processing device that adopts a multithread.

FIGS. 15 to 17 explain write buffer application methods for use in a data processing device which adopts a multi-thread method. FIG. 15 explains a vertical multithread (VMT) method with which threads are switched in terms of time. With the VMT method, store data of the different threads are prevented from being merged with the above described POST_CAN flag, which is set by a cancellation that occurs at the time of thread switching, and a proper operation is enabled. Namely, in FIG. 15, one store buffer unit 13 and one write buffer unit 14 are comprised in a similar manner as in FIG. 2. At the time of thread switching, data is fundamentally held until completion of a store without freeing up WBs. However, all of store ports and fetch ports which hold an address and an instruction of SFB are freed up, and made available immediately on the side of a new thread.

FIG. 16 explains the first case of a multithread method called a horizontal multithread (HMT) or a simultaneous multithread (SMT), with which 2 threads can simultaneously operate. In this figure, a write buffer unit 14 is shared by store buffer units 13a and 13b that respectively correspond to the 2 threads.

Therefore, merging control between the threads using the POST_CAN flag is impossible. Alternatively, thread IDs are respectively possessed by the WB_BOQ flag storing unit 41 and the WB_GO flag storing unit 42, which are shown in FIG. 4, and a determination of a match between these 2 thread IDs is added as a control condition for the output of the INH_MERGE signal from the merge condition verifying unit 43. If the thread IDs mismatch, the INH_MERGE signal is set, whereby merging of data between the different threads can be prevented.

FIG. 17 explains the second case of the SMT or the HMT method. In this case, a store buffer unit 13 and a write buffer unit 14, which are dedicated to threads respectively, are comprised, and there is no need to perform a special control, and operations are performed in exactly the same manner as in the above provided explanation.

FIG. 18 explains a data aligning method in this preferred embodiment. This preferred embodiment assumes that store data is already aligned to a memory image when being stored in a write buffer, namely, the store data is in the same format as that when being stored in the memory such as the main storage. In this way, a data path delay caused when data is written from a WB to the primary cache is reduced. To implement this reduction, an aligning circuit is moved from between the WB and the primary cache to between the arithmetic unit and a store buffer unit, and between the store buffer unit and the write buffer unit.

As shown in FIG. 18, the aligning circuit arranged between the EU and the store buffer unit aligns the store data output from the EU by using length information which indicates the length of an operand for a store request, and an alignment code which indicates whether the store data output from the EU is stored on either the right side or the left side of the data path.

According to these two items of information, the store data is copied by a number (obtained by dividing 8 by the flag LENGTH), and located within an 8-byte store buffer, so that the data alignment is completed. For example, if the length is 2 bytes, the data is copied and four 2-byte data are arranged within the 8-byte store buffer, so that the data alignment is completed. This is performed to simplify the aligning circuit.

In FIG. 18, the store data output from the store buffer unit, namely, the store port is aligned with an endian by the aligning circuit that is arranged between the store buffer unit and the write buffer unit. Since copied values are stored in respective bytes in the data output from the store port as described above, the alignment with the endian is completed by writing the data to the write buffer unchanged according to an instruction of the endian, or by entirely reversing and writing the data from the start to the end.

The aligning method is not limited to the above described one. Any data aligning method may be adopted. However, the data written to the write buffer is required to have been expanded to a memory image in all cases. This makes it convenient to merge data in the write buffer.

Additionally, in this preferred embodiment, appropriate floorplanning is performed so that the aligning circuit is divided into two as describe above, a path inclusive of one aligning circuit between the arithmetic unit and the store buffer unit becomes short, the write buffer unit is arranged close, for example, to the cache memory, and a path inclusive of the other aligning circuit between the store buffer unit and the write buffer unit is arranged to be long.

FIG. 19 exemplifies the storage controlling unit comprising write buffers of a plurality of hierarchies in this preferred embodiment. In this figure, in a similar manner as in FIG. 2, data from the arithmetic unit 11 is written to a store port within the store buffer unit 13 in correspondence with a request from the instruction unit 10, the data is then written from the store buffer unit 13 to a write buffer in the first hierarchy, written from the write buffer in the first hierarchy to a write buffer in the second hierarchy, similarly, from a write buffer in an (N−1)th hierarchy to a write buffer in an Nth hierarchy, and finally, from the write buffer in the Nth hierarchy to the primary cache, or the memory such as the main storage, etc.

In FIG. 19, control for the data write from the EU 11 to the store buffer unit 13, and the data write from the write buffer in the Nth hierarchy, which is the last hierarchy, to the primary cache is performed in exactly the same manner as in the above provided explanation. For example, the widths of all of store ports within the store buffer unit 13 and those of all of write buffers in the write buffer unit are made identical, so that the processes for the store ports and the write buffers in the respective hierarchies can be performed within the same time frames and the number of store requests that can stay can be increased as a whole.

The data write process in FIG. 19 is further described. In FIG. 19, this write process is divided into a write operation from the EU 11 to a store port within the store buffer unit 13, a write operation from the store port within the store buffer unit 13 to a write buffer unit within a write buffer unit $14_1$ in the first hierarchy, a write operation between write buffers within write buffer units in respective hierarchies, and a write operation from the write buffer within the write buffer unit $14_n$ in the Nth hierarchy to the primary cache 15.

The operation from the EU 11 to the store buffer unit 13 among these write operations is the same with that in FIG. 2. The data write operation from the write buffer unit $14_n$ in the Nth hierarchy to the primary cache 15 is the same with that from the write buffer unit 14 to the primary cache 15 in FIG. 2. Additionally, the data write operation from the store buffer unit 13 to the write buffer unit $14_1$ in the first hierarchy, and the data write operation between the write buffer units in the respective hierarchies are similar to that from the store buffer unit 13 to the write buffer unit 14 in FIG. 2.

As described above, the data write operation from the store buffer unit 13 to the write buffer unit $14_1$ in the first hierarchy can be exactly made identical to that from the store buffer unit 13 to the write buffer unit 14 in FIG. 2. The data write operation between the write buffer units in the respective hierarchies can be also performed by changing part of the data write operation from the store buffer unit 13 to the write buffer unit 14 in FIG. 2.

For example, if the data widths of write buffers in write buffer units in the respective hierarchies are made identical, data merging never occurs among the write buffers within the write buffer units in the respective hierarchies. Therefore, a data merging capability can be removed from among the write buffer units in the respective hierarchies. In this case, for example, the control of input signals for the write destination WB selection controlling unit, which is described with reference to FIG. 10, and the like can be simplified. A circuit that can be simplified is a circuit by which an address match is found, a circuit which performs detailed control for updating the BOQ, or the like.

Or, the data width of the write buffers within the write buffer units in the respective hierarchies can be changed. If the data width of a WB at a data write destination is made wider than that of a WB at a data write source in such a case, the possibility of store data merging arises. A merging capability is added to a process for such a portion. If there is no possibility that such merging arises, the merging capability can be removed.

If write buffer units of a plurality of hierarchies exist between the store buffer unit and the primary cache as shown in FIG. 19, and if all of write buffers in a halfway write buffer unit are empty when a write is made from a write buffer unit including a write buffer in which store data is stored to a write buffer within a write buffer unit close to the primary cache, the write is made to a write buffer within the write buffer unit in the hierarchy closest to the primary cache not via the hierarchy where all of write buffers in the write buffer unit are empty in a range that does not exceed the preceding store, so that the time required to transmit data via the write buffer units of the plurality of hierarchies can be shortened.

FIG. 20 explains such operations. As shown in this figure, a capability for selecting a write buffer unit in the hierarchy farthest from the primary cache 15 among write buffer units holding store data on the side close to the primary cache 15 when viewed from a WB being a write source is arranged, and a capability for making a data write from a WB being a write destination to a WB in a selected hierarchy is arranged. As a result, the data write to the WB in the hierarchy closest to the cache memory can be made without exceeding the preceding store.

For a selection of a write buffer unit at a write destination, it is proved that a WB holding store data exists in a hierarchy if a logical OR output of valid signals of write buffers in a write buffer unit in the hierarchy becomes "1", and that a write can be made by skipping the hierarchy if the logical OR output becomes "0". Additionally, it is proved that a data write cannot be made to a hierarchy by checking a WB_FULL signal indicating that all of WBs in each hierarchy hold store data.

If the hierarchy whose WB_FULL signal becomes "1" does not exist, a write buffer unit to which data is to be written is selected as described above. However, if the hierarchy whose WB_FULL signal becomes "1" exists, a data write is made by selecting a write buffer in a hierarchy preceding the hierarchy. A clock enable signal for the selected hierarchy is set to "1", so that the data write is made.

As described above in detail, according to the present invention, a process for a store request is divided by a store port unit which is controlled also by an instruction processing unit, and a write buffer unit which is controlled by a storage controlling apparatus, whereby the number of store requests to be processed simultaneously can be decreased respectively in the store port unit and the write buffer unit, and a processing speed can be increased.

Additionally, the number of store requests being executed and waiting to be executed can be simultaneously increased as a whole, so that the processing amount per unit time can be increased, and store request processing performance can be significantly improved.

A new arrangement of a write buffer can be adopted in all of data processing devices as far as they perform processes by using a conventional store port, and performance improvement can be expected if such adoption is made. Additionally, in this case, no modifications are required on the side of the instruction processing device, and the arrangement can be made only by making a modification on the side of the storage controlling apparatus. This is a method easy to be adopted widely, and generally.

Furthermore, a write buffer is arranged also in a data processing device that can support a multithread which has become popular recently, whereby a further improvement in performance can be implemented, which leads to a great contribution to an improvement in the throughput of the data processing device.

What is claimed is:

1. A storage controlling apparatus having a store port for holding store data that is transmitted from an arithmetic unit in correspondence with a store request transmitted from an instruction processing device, and that is to be written to a cache memory or a memory as a result of the store request, comprising:

a data storing unit receiving the store data from the store port, temporarily storing the store data, and comprised between the store port and the cache memory or the memory; and a data write controlling unit controlling a write of the store data from the store port to said data storing unit; and wherein:

the store request is divided into a plurality of divided store requests at the store port, and the data storing unit merges the divided store requests transferred from the store port into a merged store request outgoing from the data storing unit;

said data storing unit receives the store data from the store port after the instruction processing device commits execution of the store request;

said data storing unit comprises a plurality of write buffers which respectively store the store data received from the store port; and said data write controlling unit limits write buffers to a range from a write buffer in which data is stored most recently among the plurality of write buffers to a write buffer ahead by n buffers in an order where data is to be stored, when the instruction processing device simultaneously commits execution of a plurality of (n) store requests, and controls a data write to limited write buffers; and a unit resetting a flag which instructs the store port to write data to said data storing unit upon receipt of a cancellation signal of the store request transmitted from the instruction processing device is further comprised on a side of the store port.

2. A storage controlling apparatus storage controlling apparatus having a store port for holding store data that is transmitted from an arithmetic unit in correspondence with a store request transmitted from an instruction processing device, and that is to be written to a cache memory or a memory as a result of the store request, comprising:

a data storing unit receiving the store data from the store port, temporarily storing the store data, and comprised between the store port and the cache memory or the memory; and a data write controlling unit controlling a write of the store data from the store port to said data storing unit; and wherein:

the store request is divided into a plurality of divided store requests at the store port, and the data storing unit merges the divided store requests transferred from the store port into a merged store request outgoing from the data storing unit;

said data storing unit receives the store data from the store port after the instruction processing device commits execution of the store request;

said data storing unit comprises a plurality of write buffers which respectively store the store data received from the store port;

said data write controlling unit limits write buffers to being within a range from a write buffer, among the plurality of write buffers, in which data is stored most recently, to a write buffer that is ahead by n buffers in an order in which data is to be stored, when the instruction processing device simultaneously commits execution of a plurality of (n) store requests, and controls a data write to limited write buffers; and said data write controlling unit passes, to the data storing unit, a flag that indicates prohibition of a flush of a cache line, if the store request is determined to be a store request to prohibit the flush of the cache line, which corresponds to the store request, by the time the store request is completed while the store data is held by the store port.

3. The storage controlling apparatus according to claim 1, further comprising:

a unit prohibiting said data write controlling unit from merging, in said data storing unit, data stored in said data storing unit in correspondence with a preceding store request, with data from a store port, in correspondence with a next store request according to types of the preceding store request and the next store request when a cancellation of the store request is notified from the instruction processing device;

a unit forcibly prohibiting said data write controlling unit from merging, in said data storing unit, data stored in said data storing unit in correspondence with the preceding store request, with data from the store port, in correspondence with the next store request;

a unit determining whether or not to permit said data write controlling unit to merge, in said data storing unit, data stored in said data storing unit in correspondence with a preceding store request, with data from the store port, in correspondence with the next store request, and wherein:

said data write controlling unit performs data merging in said data storing unit according to a type of a store instruction, even when the data merging is forcibly prohibited;

said unit determining whether or not to permit data merging prohibits merging of data already stored in said data storing unit with data within a store port in correspondence with a cancellation signal, when the store port receives the cancellation signal of the store request, which is transmitted from a side of the instruction processing device at the time of thread switching.

4. A storage controlling apparatus having a store port for holding store data that is transmitted from an arithmetic unit in correspondence with a store request transmitted from an instruction processing device, and is to be written to a cache memory or a memory by the store request, comprising:

a data storing unit receiving the store data from the store port, temporarily storing the store data, and comprised between the store port and the cache memory or the memory; and a data write controlling unit controlling a write of the store data from the store port to said data storing unit; wherein:

the store request is divided into a plurality of divided store requests at the store port, and the data storing unit merges the divided store requests transferred from the store port into a merged store request outgoing from the data storing unit; and a unit resetting a flag which instructs the store port to write data to said data storing unit upon receipt of a cancellation signal of the store request transmitted from the instruction processing device is further comprised on a side of the store port.

5. The storage controlling apparatus according to claim 1, further comprising a memory write controlling unit controlling a data write from said data storing unit to the cache memory or the memory independently of the instruction processing device.

6. The storage controlling apparatus according to claim 1, wherein:
said data storing unit comprises one or more write buffers which respectively store the store data received from the store port; and
a unit freeing up the store port when the store data is stored in any of the one or more write buffers is further comprised.

7. The storage controlling apparatus according to claim 1, wherein said data storing unit comprises write buffers which respectively store the store data received from the store port by a number according to reply performance of the cache memory or the memory.

8. The storage controlling apparatus according to claim 1, wherein store ports which respectively hold the store data are comprised by a number according to performance of the instruction processing device.

9. The storage controlling apparatus according to claim 1, wherein said data write controlling unit passes a flag indicating a cash hit to said data storing unit, if the store request is determined to hit the cache while the store data is held by the store port.

10. A storage controlling apparatus having a store port for holding store data that is transmitted from an arithmetic unit in correspondence with a store request transmitted from an instruction processing device, and is to be written to a cache memory or a memory by the store request, comprising:
a data storing unit receiving the store data from the store port, temporarily storing the store data, and comprised between the store port and the cache memory or the memory; and
a data write controlling unit controlling a write of the store data from the store port to said data storing unit; wherein;
the store request is divided into a plurality of divided store requests at the store port, and the data storing unit merges the divided store requests transferred from the store port into a merged store request outgoing from the data storing unit; and
said data write controlling unit passes a flag, which indicates prohibition of a flush of a cache line, to said data storing unit, if the store request is determined to be a store request to prohibit the flush of the cache line, which corresponds to the store request, by the time the store request is completed while the store data is held by the store port.

11. The storage controlling apparatus according to claim 1, wherein necessary numbers of control flags required to process identical numbers of store requests are respectively held on a side of the store port and a side of said data storing unit.

12. The storage controlling apparatus according to claim 1, further comprising a unit controlling a data write from said data storing unit to a hierarchy to which data is to be written, when the data is to be written to a closest hierarchy or a hierarchy other than the closest hierarchy, if the cache memory is configured by a plurality of hierarchies, and if a store-in method, with which store data is to be written to a hierarchy closest to a central processing unit of a data processing device which includes the storage controlling apparatus among the plurality of hierarchies, is adopted.

13. The storage controlling apparatus according to claim 1, further comprising a unit controlling a data write from said data storing unit to a hierarchy to which data is to be written, when the data is to be written to a closest hierarchy or a second closest hierarchy, if the cache memory is configured by a plurality of hierarchies, and if a store-through method, with which store data is written to a hierarchy closest to a central processing unit of a data processing device which includes the storage controlling apparatus among the plurality of hierarchies depending on need, and the store data is to be written to a second closest hierarchy without fail, is adopted.

14. The storage controlling apparatus according to claim 1, further comprising a unit controlling a data write from said data storing unit to a hierarchy to which data is to be written, even when the data is to be written to any of a plurality of hierarchies of the cache memory, if the cache memory is configured by the plurality of hierarchies, and if both of store-in and store-through methods are used as methods storing data in the cache memory.

15. The storage controlling apparatus according to claim 1, further comprising a unit permitting said data write controlling unit to merge, in said data storing unit, data stored in said data storing unit in correspondence with a preceding store request, with data from a store port in correspondence with a next store request.

16. The storage controlling apparatus according to claim 15, wherein:
said data storing unit comprises one or more write buffers which respectively store the store data received from the store port; and
the one or more write buffers possess a data width that enables merging of data from the store port, and is wider than a data width possessed by the store port.

17. The storage controlling apparatus according to claim 1, further comprising a unit prohibiting said data write controlling unit from merging, in said data storing unit, data stored in said data storing unit in correspondence with a preceding store request, with data from a store port in correspondence with a next store request according to types of the preceding store request and the next store request.

18. The storage controlling apparatus according to claim 1, further comprising a unit forcibly prohibiting said data write controlling unit from merging, in said data storing unit, data stored in said data storing unit in correspondence with a preceding store request, with data from a store port in correspondence with a next store request.

19. The storage controlling apparatus according to claim 18, wherein said data write controlling unit performs data merging in said data storing unit according to a type of a store instruction, even when the data merging is forcibly prohibited.

20. The storage controlling apparatus according to claim 1, further comprising a unit prohibiting said data write controlling unit from merging, in said data storing unit, data stored in said data storing unit in correspondence with a preceding store request, with data from a store port in correspondence with a next store request, when a cancellation of the store request is notified from the instruction processing device.

21. The storage controlling apparatus according to claim 1, further comprising a unit determining whether or not to permit the store port to perform a store data bypass fetch, which externally provides the store data from the store port in correspondence with an external fetch request before the store data is stored in said data storing unit.

22. The storage controlling apparatus according to claim 21, wherein store data as a bypass permitted candidate is selected by checking matches between addresses and oper- and lengths of a store request and a fetch request in a determination of whether or not to permit the store data bypass fetch.

23. The storage controlling apparatus according to claim 1, further comprising a unit determining whether or not to permit said data storing unit to perform a store data bypass fetch, which externally provides the store data from said data storing unit in correspondence with an external fetch request before the store data is written to the cache memory or the memory.

24. The storage controlling apparatus according to claim 23, wherein store data as a bypass permitted candidate is selected by making a comparison between byte marks indicating existence positions of data respectively for a store request and a fetch request in units of plural bytes, and by omitting a comparison between identifiers indicating instruction execution orders in a determination of whether or not to permit the store data bypass fetch.

25. The storage controlling apparatus according to claim 24, wherein whether or not to permit the store data bypass fetch is finally determined by making a comparison between the byte marks in units of 1 byte, when the store data bypass fetch of data selected as the bypass permitted candidate is performed.

26. The storage controlling apparatus according to claim 25, further comprising a unit instructing said data storing unit to prohibit the store data bypass fetch, if the store data bypass fetch is not permitted in the comparison between the byte marks in units of 1 byte.

27. The storage controlling apparatus according to claim 1 configures a data processing device controlled by a central processing unit which can perform multithreading.

28. The storage controlling apparatus according to claim 27, wherein the store port and said data storing unit are shared by a plurality of threads in a multithread.

29. The storage controlling apparatus according to claim 27, wherein:
a plurality of store ports are comprised; and
said data storing unit is shared by a plurality of threads in a multithread, and the store port is exclusively held by each of the plurality of threads.

30. The storage controlling apparatus according to claim 27, wherein: pluralities of store ports and data storing units are respectively comprised; and
the pluralities of store ports and data storing units are exclusively held by a plurality of threads in the multithread respectively.

31. The storage controlling apparatus according to claim 27, wherein in correspondence with a cancellation of an inflight store request that starts to be executed at the time of thread switching and is not completed, said data write controlling unit makes said data storing unit write the data held by the store port if the store port already receives a commitment of execution of the store request from the instruction processing device, or frees up the store port without writing its data to the data storing unit if the store port does not receive the commitment of the execution yet.

32. The storage controlling apparatus according to claim 31, wherein said data write controlling unit further frees up a fetch port holding an address and an instruction in correspondence with an external data fetch request at the time of thread switching.

33. The storage controlling apparatus according to claim 27, further comprising a unit holding a thread identifier for identifying each of a plurality of threads in the multithread respectively for the store port and said data storing unit.

34. The storage controlling apparatus according to claim 33, further comprising a unit determining whether or not to permit the store port or said data storing unit to perform a store data bypass fetch, which externally provides the store data from the store port or said data storing unit in correspondence with an external fetch request before the store data is stored in said data storing unit or written to the cache memory or the memory, wherein said unit determining whether or not to permit the store data bypass fetch makes a comparison between an identifier of a thread held for the store port or said data storing unit, and an identifier of a thread requesting a fetch, and prohibits the store data bypass fetch between the threads having different identifiers.

35. The storage controlling apparatus according to claim 33, further comprising a unit determining whether or not to permit said data write controlling unit to merge, in said data storing unit, data stored in said data storing unit in correspondence with a preceding store request, with data from a store port in correspondence with a next store request, wherein said unit determining whether or not to permit data merging makes a comparison between identifiers of threads respectively held for the store port and said data storing unit, and prohibits data merging between the threads having different identifiers.

36. The storage controlling apparatus according to claim 27, further comprising a unit determining whether or not to permit said data write controlling unit to merge, in said data storing unit, data stored in said data storing unit in correspondence with a preceding store request, with data from a store port in correspondence with a next store request, wherein said unit determining whether or not to permit data merging prohibits merging of data already stored in said data storing unit with data within a store port in correspondence with a cancellation signal, when the store port receives the cancellation signal of the store request, which is transmitted from a side of the instruction processing device at the time of thread switching.

37. The storage controlling apparatus according to claim 1, further comprising a unit aligning the store data to a same format as a format when being stored in the memory by the time the store data is stored in said data storing unit.

38. The storage controlling apparatus according to claim 37, wherein said unit aligning the store data comprising a unit performing an alignment process according to an address and an operand length of store data for the store data transmitted from the arithmetic unit, and providing the store data after being aligned to the store port, and a unit performing an alignment process according to an endian for the store data output from the store port, and providing the aligned store data to said data storing unit.

39. The storage controlling apparatus according to claim 38, wherein:
a store port and said unit performing the alignment process according to an address and an operand length are arranged in positions close to the arithmetic unit;
said data storing unit is arranged in a position close to the cache memory or the memory; and
said unit performing the alignment process according to an endian, and said data storing unit are arranged so that a distance between said unit and said data storing unit is made long.

40. The storage controlling apparatus according to claim 1, wherein:
said data storing unit comprises one or more write buffers which respectively store the store data received from the store port; and
said data write controlling unit performs a control for writing the data output from the store port to a write buffer in which data is stored most recently, or to a write buffer in which data is to be stored next among the plurality of one or more write buffers.

41. The storage controlling apparatus according to claim 1, wherein said data storing unit further comprises a cache line requesting unit entering a cache line request for the store request to a pipeline of the storage controlling apparatus, when the store request misses the cache.

42. The storage controlling apparatus according to claim 1, wherein:
said data storing unit comprises a plurality of write buffers which respectively store the store data received from a side of the store port; and
a memory write controlling unit performing a control for writing data to the cache memory or the memory from a write buffer other than a write buffer in which data is stored from the store port most recently among the plurality of write buffers is further comprised.

43. The storage controlling apparatus according to claim 1, wherein:
said data storing unit comprises a plurality of write buffers which respectively store the store data received from a side of the store port; and
a memory write controlling unit making a write buffer, in which data is stored most recently, write data to the cache memory or the memory when the store port becomes empty is further comprised.

44. The storage controlling apparatus according to claim 1, wherein:
said data storing unit comprises a plurality of write buffers which respectively store the store data received from a side of the store port; and
a memory write controlling unit making a write buffer, in which data is stored most recently, write data, if a succeeding instruction cannot be executed because a data write is not made from the write buffer to the cache memory or the memory is further comprised.

45. The storage controlling apparatus according to claim 1, wherein:
said data storing unit comprises a plurality of write buffers which respectively store the store data received from a side of the store port; and
a memory write controlling unit making a write buffer, in which data is stored most recently, write data in order to allow a cache line to be freed up, if the cache line for the data stored in the write buffer is externally requested to be freed up is further comprised.

46. The storage controlling apparatus according to claim 1, wherein:
said data storing unit comprises a plurality of write buffers which respectively store the store data received from a side of the store port; and
a memory write controlling unit making a write buffer, in which data is stored most recently, write data, if merging of data stored in the write buffer with data for a different store request is prohibited is further comprised.

47. A storage controlling apparatus performing a control in correspondence with a store request transmitted from an instruction processing device, comprising: a plurality of buffer units respectively storing store data that is transmitted from an arithmetic unit in correspondence with the store request, and is to be written to a cache memory or a memory; and
a memory write controlling unit targeting only a buffer unit in which data is stored earliest among the plurality of buffer units, and performing a control for aborting storage of the store data in the cache memory or the memory, if a length of the store data is shorter than a length of a unit area for which data error management is made in the cache memory or the memory.

48. A storage controlling apparatus storage controlling apparatus having a store port for holding store data that is transmitted from an arithmetic unit in correspondence with a store request transmitted from an instruction processing device, and that is to be written to a cache memory or a memory as a result of the store request, comprising:
a data storing unit receiving the store data from the store port, temporarily storing the store data, and comprised between the store port and the cache memory or the memory; and
a data write controlling unit controlling a write of the store data from the store port to said data storing unit;
a memory write controlling unit, performing a control for writing data to the cache memory or the memory from a write buffer other than a write buffer, from among a plurality of write buffers, in which data is stored most recently from the store port, or making a write buffer, in which data is stored most recently, write data to the cache memory or the memory when the store port becomes empty; or
making the write buffer, in which data is stored most recently, write data, if a succeeding instruction cannot be executed because a data write is not made from the write buffer to the cache memory or the memory; or
making a write buffer, in which data is stored most recently, write data in order to allow a cache line to be freed up, if the cache line for the data stored in the write buffer is externally requested to be freed up; or
making a write buffer, in which data is stored most recently, write data, if merging of data stored in the write buffer with data for a different store request is prohibited, and wherein:
the store request is divided into a plurality of divided store requests at the store port, and the data storing unit merges the divided store requests transferred from the store port into a merged store request outgoing from the data storing unit;
said data storing unit receives the store data from the store port after the instruction processing device commits execution of the store request;
said data storing unit comprises the plurality of write buffers which respectively store the store data received from the store port; and
said data write controlling unit limits write buffers to being within a range from a write buffer, among the plurality of write buffers, in which data is stored most recently, to a write buffer that is ahead by n buffers in an order where data is to be stored, when the instruction processing device simultaneously commits execution of a plurality of (n) store requests, and controls a data write to limited write buffers.

49. A storage controlling apparatus having a store port for holding store data that is transmitted from an arithmetic unit in correspondence with a store request transmitted from an instruction processing device, and that is to be written to a cache memory or a memory as a result of the store request, comprising:
data storing units of a plurality of hierarchies temporarily holding the store data respectively, and comprised between the store port and the cache memory or the memory;
a store data write controlling unit controlling a write of the store data from the store port to the cache memory or the memory via data storing units of one or more hierarchies among the plurality of hierarchies;

said data storing units of the plurality of hierarchies respectively comprise a plurality of write buffers;

a data write controlling unit controlling a write of the store data from the store port to said data storing unit, and wherein:

the store request is divided into a plurality of divided store requests at the store port, and the data storing unit merges the divided store requests transferred from the store port into a merged store request outgoing from the data storing unit;

said data storing unit receives the store data from the store port after the instruction processing device commits execution of the store request;

said data storing unit including the plurality of write buffers which respectively store the store data received from the store port;

said data write controlling unit limits write buffers to being within a range from a write buffer, among the plurality of write buffers, in which data is stored most recently, to a write buffer ahead by n buffers in an order where data is to be stored, when the instruction processing device simultaneously commits execution of a plurality of (n) store requests, and controls a data write to limited write buffers;

if a hierarchy in which all of the plurality of write buffers hold data does not exist among the plurality of hierarchies, said store data write controlling unit controls a write of the store data from the store port not via a hierarchy in which all of the plurality of write buffers are empty, but via a write buffer unit in a hierarchy in which a write buffer to which the store data can be written exists; and if hierarchies in which all of the plurality of write buffers hold data exist, said store data write controlling unit controls the write of the store data via a write buffer unit in a hierarchy, from among the hierarchies in which all of the plurality of write buffers hold data, that is closer by one hierarchy than a hierarchy close to the store port.

* * * * *

UNITED STATES PATENT AND TRADEMARK OFFICE
CERTIFICATE OF CORRECTION

PATENT NO. : 7,281,091 B2 Page 1 of 1
APPLICATION NO. : 10/349022
DATED : October 9, 2007
INVENTOR(S) : Iwao Yamazaki It is certified that error appears in the above-identified patent and that said Letters Patent is hereby corrected as shown below:

Column 31, Line 34, change "wherein;" to --wherein:--.

Column 36, Line 3-4, after "apparatus" delete "storage controlling apparatus".

Signed and Sealed this

Eighth Day of April, 2008

JON W. DUDAS
*Director of the United States Patent and Trademark Office*